(12) United States Patent
Trepina et al.

(10) Patent No.: US 9,141,105 B2
(45) Date of Patent: Sep. 22, 2015

(54) METHOD AND APPARATUS FOR MONITORING OR CONTROLLING A MACHINE TOOL SYSTEM

(75) Inventors: Matthew David Trepina, Westfield, IN (US); Elias G Pavlakos, Westfield, IN (US); Gregory S Volovic, Carmel, IN (US); John Christopher Allen, Anderson, IN (US); James D. Fabris, Carmel, IN (US)

(73) Assignee: Hurco Companies, Inc., Indianapolis, IN (US)

(*) Notice: Subject to any disclaimer, the term of this patent is extended or adjusted under 35 U.S.C. 154(b) by 1867 days.

(21) Appl. No.: 12/178,422

(22) Filed: Jul. 23, 2008

(65) Prior Publication Data

US 2010/0023156 A1 Jan. 28, 2010

(51) Int. Cl.
*G06F 19/00* (2011.01)
*G05B 19/406* (2006.01)

(52) U.S. Cl.
CPC .................................. *G05B 19/406* (2013.01)

(58) Field of Classification Search
USPC ................ 700/88, 174, 185; 706/11; 709/227
See application file for complete search history.

(56) References Cited

U.S. PATENT DOCUMENTS

| | | | |
|---|---|---|---|
| 1,380,908 A | 6/1921 | Hothersall | |
| 5,006,976 A | 4/1991 | Jundt | |
| 5,122,948 A | 6/1992 | Zapolin | |
| 5,189,625 A * | 2/1993 | Le Floch | 382/152 |
| 5,212,645 A | 5/1993 | Wildes et al. | |
| 5,291,416 A | 3/1994 | Hutchins | |
| 5,446,672 A * | 8/1995 | Boldys | 700/174 |
| 5,508,909 A | 4/1996 | Maxwell et al. | |
| 5,594,663 A | 1/1997 | Messaros et al. | |
| 5,726,912 A | 3/1998 | Krall, Jr. et al. | |
| 5,754,451 A | 5/1998 | Williams | |
| 5,757,648 A * | 5/1998 | Nakamura | 700/169 |
| 5,790,977 A | 8/1998 | Ezekiel | |
| 5,805,442 A | 9/1998 | Crater et al. | |
| 5,848,859 A | 12/1998 | Clark et al. | |
| 5,975,737 A | 11/1999 | Crater et al. | |
| 5,982,362 A | 11/1999 | Crater et al. | |
| 5,984,499 A | 11/1999 | Nourse et al. | |
| 6,006,141 A | 12/1999 | Yoneda et al. | |
| 6,038,486 A | 3/2000 | Saitoh et al. | |
| 6,061,603 A | 5/2000 | Papadopoulos et al. | |
| 6,094,600 A | 7/2000 | Sharpe, Jr. et al. | |

(Continued)

FOREIGN PATENT DOCUMENTS

EP        1380908        1/2004

OTHER PUBLICATIONS

International Search Report for International Application No. PCT/US2009/046444, mailed Dec. 8, 2009 (21 pages).

(Continued)

*Primary Examiner* — Mohammad Ali
*Assistant Examiner* — Sheela S Rao
(74) *Attorney, Agent, or Firm* — Faegre Baker Daniels LLP

(57) ABSTRACT

A system for remotely monitoring one or more machine tool systems is disclosed. The system may monitor a plurality of machine tool systems which are associated with different customers and at a plurality of facilities. A remote user may access information regarding the machine tool system through a user interface and specific that notifications be sent upon the occurrence of various conditions. A system for updating software of a machine tool system is also disclosed.

9 Claims, 32 Drawing Sheets

(56) References Cited

U.S. PATENT DOCUMENTS

| | | | |
|---|---|---|---|
| 6,101,425 A | 8/2000 | Govindaraj et al. |
| 6,219,583 B1 | 4/2001 | Kinoshita et al. |
| 6,246,920 B1 | 6/2001 | Mizuno et al. |
| 6,263,487 B1 | 7/2001 | Stripf et al. |
| 6,298,308 B1 | 10/2001 | Reid et al. |
| 6,338,003 B1 | 1/2002 | Kamiguchi et al. |
| 6,363,282 B1 | 3/2002 | Nichols et al. |
| 6,370,455 B1 | 4/2002 | Larson et al. |
| 6,385,497 B1 | 5/2002 | Ogushi et al. |
| 6,393,380 B1 | 5/2002 | Zemlo |
| 6,445,959 B1 | 9/2002 | Poth |
| 6,463,352 B1 | 10/2002 | Tadokoro et al. |
| 6,470,377 B1 | 10/2002 | Sevcik et al. |
| 6,473,656 B1 | 10/2002 | Langels et al. |
| 6,539,271 B2 | 3/2003 | Lech et al. |
| 6,542,925 B2 | 4/2003 | Brown et al. |
| 6,556,956 B1 | 4/2003 | Hunt |
| 6,560,513 B2 | 5/2003 | Krause et al. |
| 6,580,959 B1 | 6/2003 | Mazumder |
| 6,757,714 B1 | 6/2004 | Hansen |
| 6,788,980 B1 | 9/2004 | Johnson |
| 6,799,077 B1 | 9/2004 | Hauet |
| 6,799,195 B1 | 9/2004 | Thibault et al. |
| 6,826,607 B1 | 11/2004 | Gelvin et al. |
| 6,834,214 B2 | 12/2004 | Davison et al. |
| 6,845,401 B1 | 1/2005 | Papadopoulos et al. |
| 6,853,867 B1 | 2/2005 | Klindt et al. |
| 6,909,990 B2 | 6/2005 | Okazaki et al. |
| 6,928,327 B2 | 8/2005 | Albert et al. |
| 6,934,777 B2 | 8/2005 | Kawamura et al. |
| 6,952,680 B1 | 10/2005 | Melby et al. |
| 6,954,680 B2 | 10/2005 | Kreidler et al. |
| 6,975,913 B2 | 12/2005 | Kreidler et al. |
| 7,011,613 B2 | 3/2006 | Moller et al. |
| 7,020,701 B1 | 3/2006 | Gelvin et al. |
| 7,028,226 B2 | 4/2006 | Fleuter |
| 7,069,185 B1 | 6/2006 | Wilson et al. |
| 7,099,736 B2 | 8/2006 | Fujishima et al. |
| 7,110,837 B2 | 9/2006 | Oka et al. |
| 7,117,239 B1 | 10/2006 | Hansen |
| 7,123,974 B1 | 10/2006 | Hamilton |
| 7,127,322 B2 | 10/2006 | Kreidler et al. |
| 7,146,408 B1 | 12/2006 | Crater et al. |
| 7,184,423 B2 | 2/2007 | Bryan et al. |
| 7,185,014 B1 | 2/2007 | Hansen |
| 7,203,560 B1 | 4/2007 | Wylie et al. |
| 7,206,646 B2 | 4/2007 | Nixon et al. |
| 7,216,007 B2 | 5/2007 | Johnson |
| 7,225,037 B2 | 5/2007 | Shani |
| 7,272,815 B1 | 9/2007 | Eldridge et al. |
| 7,292,900 B2 | 11/2007 | Kreidler et al. |
| 7,313,609 B1 | 12/2007 | Wischinski |
| 7,330,878 B2 | 2/2008 | Slavin et al. |
| 7,346,404 B2 | 3/2008 | Eryurek et al. |
| 7,353,073 B2 | 4/2008 | Ferchau |
| 7,389,204 B2 | 6/2008 | Eryurek et al. |
| 7,395,122 B2 | 7/2008 | Kreidler et al. |
| 7,403,984 B2 | 7/2008 | Ellis et al. |
| 7,424,327 B2 | 9/2008 | Grgic et al. |
| 7,424,329 B2 | 9/2008 | McKelvey et al. |
| 7,441,114 B2 | 10/2008 | Collier et al. |
| 7,480,709 B2 | 1/2009 | Callaghan |
| 7,490,138 B2 | 2/2009 | Crater et al. |
| 7,502,323 B2 | 3/2009 | Brun et al. |
| 7,502,656 B2 | 3/2009 | Thibault et al. |
| 7,509,249 B2 | 3/2009 | Britt et al. |
| 7,522,573 B2 | 4/2009 | Bryan et al. |
| 7,937,370 B2 | 5/2011 | Hansen |
| 2002/0116550 A1 | 8/2002 | Hansen |
| 2002/0156542 A1* | 10/2002 | Nandi ............................. 700/30 |
| 2002/0161895 A1* | 10/2002 | Appiah et al. ................ 709/227 |
| 2003/0014498 A1 | 1/2003 | Kreidler et al. |
| 2003/0033041 A1 | 2/2003 | Richey |
| 2003/0065418 A1 | 4/2003 | Kwak |
| 2003/0208293 A1 | 11/2003 | Mountcastle et al. |
| 2004/0125206 A1 | 7/2004 | Lohmann |
| 2004/0167659 A1 | 8/2004 | Scherer |
| 2005/0012818 A1* | 1/2005 | Kiely et al. ................... 348/143 |
| 2005/0071124 A1 | 3/2005 | Komatsu |
| 2005/0080799 A1 | 4/2005 | Harnden et al. |
| 2005/0143850 A1 | 6/2005 | Pavlik et al. |
| 2005/0149212 A1 | 7/2005 | Geissdorfer et al. |
| 2005/0194163 A1 | 9/2005 | Wray |
| 2005/0207618 A1 | 9/2005 | Wohler et al. |
| 2005/0288809 A1 | 12/2005 | Spaeth et al. |
| 2006/0058907 A1 | 3/2006 | Suderman |
| 2007/0011295 A1 | 1/2007 | Hansen |
| 2007/0129826 A1 | 6/2007 | Kreidler et al. |
| 2008/0058993 A1 | 3/2008 | Tain et al. |
| 2008/0162671 A1 | 7/2008 | Mann |
| 2009/0062950 A1 | 3/2009 | Chen |
| 2009/0288003 A1* | 11/2009 | Marinkovic .................. 715/708 |
| 2010/0076617 A1* | 3/2010 | Van Den Keybus et al. . 700/297 |

OTHER PUBLICATIONS

Davis, Tyler A., *Flexible Machine Tool Control for Direct, In-Process Dimensional Part Inspection*, Master of Science Thesis, Aug. 2004, Dept. of Mechanical Engineering, Brigham Young University, Provo, UT, 109 p.

*MobileMe iDisk* webpage, 1 p.

*MobileMe on your Mac* found at http://www.apple.com/mobileme/features/mac.htmlJul. 24, 2008, 6 p.

*MobileMe on your PC* found at http://www.apple.com/mobileme/features/pc.htmlJul. 24, 2008, 3 p.

*MobileMe on your iPhone or iPod touch* found at http://www.apple.com/mobileme/features/iphone.htmlJul. 24, 2008, 3 p.

*Hurco in Control: WinMax Control Software* found at www.hurco.com, 16 p.

Partial International Search Report for International Application No. PCT/US2009/046444, mailed Sep. 30, 2009 (8 pages).

* cited by examiner

METHOD AND APPARATUS FOR MONITORING OR CONTROLLING A MACHINE TOOL SYSTEM

FIELD OF THE INVENTION

The present invention relates to monitoring and controlling one or more machine tool systems. More particularly, the present invention relates to monitoring and controlling one or more machine tool systems over one or more networks.

BACKGROUND

Machine tool systems are monitored and controlled by various parties, including operators, field engineers, and diagnostic engineers. Often, these parties are based in multiple locations, but the monitoring and controlling of the actual machine tool system is performed on site through interaction with the machine tool system.

SUMMARY

In an exemplary embodiment of the present disclosure, a method of monitoring a machining of a part from a blank is provided. The method comprising the step of providing a machine tool system including a machine tool controller and a machine tool apparatus which supports the blank and at least one tool which are used to remove material from the blank. The machine tool apparatus including a plurality of moveable axes which change the relative position of the at least one tool and the blank. The method further comprising the steps of providing a part program which specifies a plurality of instructions, the plurality of instructions defining at least one trajectory for the at least one tool to follow; executing the part program with a machine tool software portion of the machine tool controller; receiving a notification from a remote controller that the machine tool system is being observed by a user system spaced apart from the machine tool system and the remote controller; and sending information from the machine tool system to the remote controller, the information being collected by the machine tool system. The information is provided to the remote controller at a first frequency when the machine tool system is being observed and at a second frequency when the machine tool system is other than being observed. The second frequency being lower than the first frequency. In an example, the information being collected by the machine tool system includes a screen shot of a display of the machine tool system. In another example, the information being collected by the machine tool system includes at least one image captured by a camera associated with the machine tool system, the camera being located within a cabinet of the machine tool system. In a further example, the information being collected by the machine tool system includes at least one image captured by a camera associated with the machine tool system. The camera being located outside of a cabinet of the machine tool system. In yet another example, the first frequency is at least about 10 times the second frequency. In yet a further example, the first frequency is at least about 100 times the second frequency.

In another exemplary embodiment of the present disclosure, a machine tool system which is operated by a machine tool operator is provided. The machine tool system comprising a cabinet; a machine tool apparatus provided within the cabinet; a machine tool controller operatively coupled to the machine tool apparatus; and a user interface positioned outside of the cabinet. The machine tool controller including communication software which is capable of connecting the machine tool system to a remote controller. The machine tool controller being configured to collect information about the machine tool system to send to the remote controller at a first frequency and at a second frequency when the machine tool controller receives an indication from the remote controller that the machine tool system is being observed. The second frequency being higher than the first frequency.

In yet another exemplary embodiment of the present disclosure, a method of monitoring with a remote controller a first machine tool system and a second machine tool system, each of the machine tool systems having a plurality of tools which are used to remove material from a respective blank to form a respective part is provided. The method comprising the steps of receiving a first notification from the first machine tool system that the first machine tool system is active, the first notification being provided through a first data connection to the remote controller, the first data connection being initiated by the first machine tool system; receiving a second notification from the second machine tool system that the second machine tool system is active, the second notification being provided through a second data connection to the remote controller, the second data connection being initiated by the second machine tool system; receiving periodic updates from the first machine tool system related to a plurality of parameters being monitored by the first machine tool system; receiving periodic updates from the second machine tool system related to a plurality of parameters being monitored by the second machine tool system; and providing to a remote device a user interface which includes a graphical representation of the first machine tool system and a graphical representation of the second machine tool system. In an example, the method further comprises the step of notifying the first machine tool system that the remote device has selected the first machine tool system. In a variation thereof, the periodic updates from the first machine tool system are at a first time interval and the periodic updates from the second machine tool system are at a second time interval. The first time interval being shorter than the second time interval. In another example, the periodic updates from the first machine tool system are at a first time internal and the periodic updates from the second machine tool system are at a second time interval. The first time interval being generally equal to the second time interval. In a further example, the method further comprises the steps of sending a first request to the first machine tool system to provide at least one screen shot of a first display screen of the user interface of the first machine tool; and receiving the at least one screen shot of the first display screen of the user interface of the first machine tool. In still a further example, the method further comprises the steps of: sending a second request to the first machine tool to provide at least one image taken by a camera directed at the first machine tool; and receiving the at least one image taken by the camera directed at the first machine tool. In a variation thereof, the at least one image is a plurality of images taken at spaced apart time intervals of at least one second. In yet still another example, the first machine tool is at a first facility and the second machine tool is at a second facility spaced apart from the first facility.

In yet a further exemplary embodiment of the present disclosure, a machine tool system which is operated by a machine tool operator is provided. The machine tool system comprising a cabinet; a machine tool apparatus provided within the cabinet; a machine tool controller operatively coupled to the machine tool apparatus; a user interface positioned outside of the cabinet; a first camera situated to view the machine tool apparatus positioned within the cabinet; and a second camera situated to view the user interface positioned outside of the cabinet. The machine tool controller provides a first plurality of images captured by the first camera and a second plurality of images captured by the second camera to a remote controller spaced apart from the machine tool system. In an example, the machine tool controller further provides to the remote controller a last known error which was presented to the machine tool operator through the user interface.

In still another exemplary embodiment of the present disclosure, a method of monitoring a machining of a part from a blank is provided. The method comprising the steps of: providing a machine tool system including a machine tool controller and a machine tool apparatus which supports the blank and at least one tool which are used to remove material from the blank, the machine tool apparatus including a plurality of moveable axes which change the relative position of the at least one tool and the blank, the machine tool system including machine tool software including motion control software and user interface software; providing a part program which specifies a plurality of instructions, the plurality of instructions defining at least one trajectory for the at least one tool to follow and at least a first event marker; executing the part program with the machine tool software portion of the machine tool controller; detecting an occurrence of the first event marker when the execution of the part program reaches the first event marker; and notifying a remote controller spaced apart from the machine tool system of the occurrence of the first event marker. In an example, the step of notifying the remote controller spaced apart from the machine tool system of the occurrence of the first event marker, comprises the steps of: establishing a connection between the machine tool system and the remote controller; and sending an indication of the occurrence of the first event marker to the remote controller. In a variation thereof, the connection is established from the machine tool system to the remote controller. In another example, the first event marker is placed in the part program to indicate that a first portion of the part program is complete. In a variation thereof, the first portion of the part program corresponds to a completion of a cycle of the part program. In yet another example, the part program includes G and M codes and the first event marker is a specified M code.

In still a further exemplary embodiment of the present disclosure, a method of monitoring a machine tool system having a plurality of tools which are used to remove material from a blank to form a part is provided. The method comprising the steps of receiving from a remote device a request to monitor for a first event marker at the machine tool system, the first event marker related to the an execution of a part program by the machine tool system; receiving an indication of an occurrence of the first event marker at the machine tool system; and sending a notification of the occurrence of the first event marker to a specified contact. In an example, the indication of the occurrence of the first event marker is provided by the machine tool system over a network. In another example, the method further comprises the step of sending a message to the machine tool system to monitor for the first event marker. In a variation thereof, the first event marker is provided in the part program and the indication of the occurrence of the first event marker corresponds to the execution of the part program reaching the first event marker. in a further example, the method further comprises the step of receiving from the remote device a notification destination, wherein the step of sending the notification of the occurrence of the first event marker to the specified contact includes the step of sending the notification of the occurrence of the first event marker to the notification destination. In a variation thereof, the notification destination is an e-mail address.

In yet still a further exemplary embodiment of the present disclosure, a method of monitoring a machine tool system having a plurality of tools which are used to remove material from a blank to form a part is provided. The method comprising the steps of logging in to a user interface provided by a remote controller; selecting the machine tool system from a plurality of machine tool systems presented by the user interface; sending a request to a remote controller to monitor for a first event marker at the machine tool system, the first event marker related to an execution of a part program by the machine tool system; and sending a notification destination to the remote controller to specify a desired destination for the notification. In an example, the method further comprises the step of receiving a notification of the occurrence of the first event marker at the notification destination. In a variation thereof, the request to the remote controller to monitor for the first event marker is made from a first user device and the notification of the occurrence of the first event marker is received by the first user device. In another example, the request to the remote controller to monitor for the first event marker is made from a first user device and the notification of the occurrence of the first event marker is received by a second user device.

In yet further still another exemplary embodiment a method of monitoring a machine tool system having a plurality of tools which are used to remove material from a blank to form a part is provided. The method comprising the steps of receiving collected information from the machine tool system at a remote controller spaced apart from a facility wherein the machine tool system is located, the collected information including a running time for a machine tool component; comparing the collected information with a suggested running time for the machine tool component under a warranty associated with the machine tool system to determine if an alert condition exists; and sending an alert notification to a remote device if an alert condition exists. In an example, the alert condition corresponds to the running time for the machine tool component exceeding the suggested running time for the machine tool component. In another example, the alert condition corresponds to the running time for the machine tool component approaching the suggested running time for the machine tool component. In a further example, the alert notification is sent to a user responsible for preventative maintenance of the machine tool system. In still another example, the alert notification is sent to a user responsible for warranty compliance. In a still further example, the method further comprises the steps of: comparing a preventative maintenance parameter of the collected information received from the machine tool system to an acceptable range associated with that parameter; and sending a notification to the remote device if the preventative maintenance parameter of the collected information is outside of the acceptable range.

In another exemplary embodiment of the present disclosure, a method of updating software on a machine tool system is provided. The method comprising the steps of connecting the machine tool system to a remote controller spaced apart from a facility including the machine tool system; comparing a software component stored on a memory of the machine tool system with a corresponding software component accessible by the remote controller; replacing the software component of the machine tool system with the corresponding software component if the corresponding software component is different than the software component, wherein the corresponding software component is ready to function in replace of the software component when stored on the memory; and executing a part program with the corresponding software component, the part program specifies a plurality of instructions, the plurality of instructions defining at least one trajectory for the at least one tool to follow. In an example, the software component is a real time motion control software.

In still another exemplary embodiment of the present disclosure, a method of managing part programs for execution by a machine tool system is provided. The method comprising the steps of pushing a part program to a machine tool system from a remote controller; and providing a timetable for execution of the part program to a machine tool operator, the timetable being provided in one of a notification to the machine tool operator and inclusion of the timetable in an event log of upcoming jobs for the machine tool system.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

A detailed description particularly refers to the accompanying figures in which:

FIG. 17 is a representative view of a main machine screen of the user interface presented to the user by the user system of FIG. 1 presenting a visual icon for each machine tool system that the user is authorized to view information about and/or interact with;

Corresponding reference characters indicate corresponding parts throughout the several views.

DETAILED DESCRIPTION OF THE DRAWINGS

The embodiments disclosed herein are not intended to be exhaustive or limit the invention to the precise form disclosed in the following detailed description. Rather, the embodiments are chosen and described so that others skilled in the art may utilize the teachings.

Figure 1:
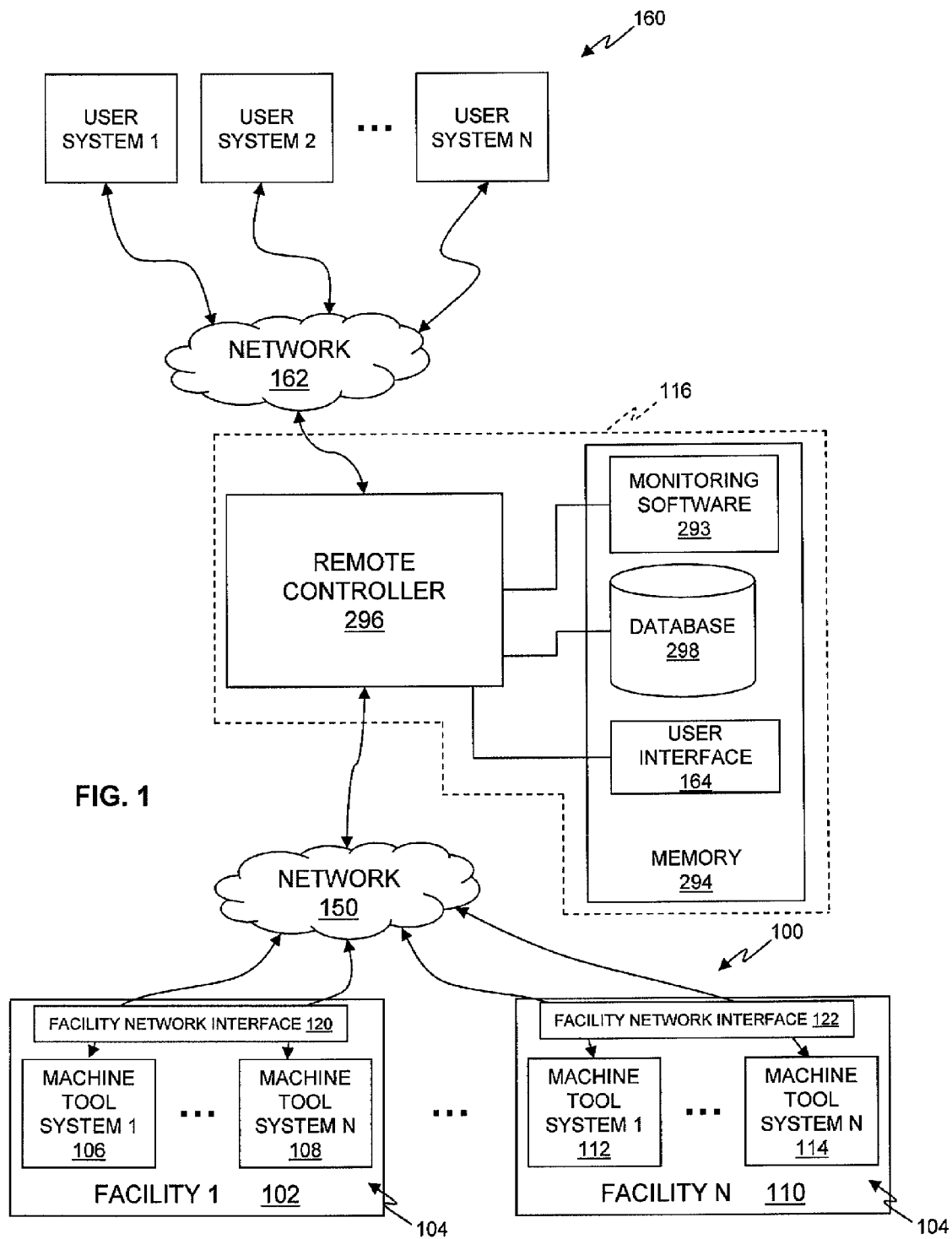
FIG. 1 is a representative view of a plurality of machine tool systems, a remote controller, and a plurality of user systems.

Referring to FIG. 1, a plurality of facilities 100 are shown. A first representative facility 102 includes a plurality of machine tool systems 104, illustratively machine tool system 106 and machine tool system 108. A second representative facility 102 includes a plurality of machine tool system 110, illustratively machine tool system 112 and machine tool system 114. first representative facility 102 and plurality of machine tool system 110 are spaced apart geographically. Although only two facilities are illustrated with two machine tools each, the methods disclosure herein may be used for more or less facilities each of which may have any number of machine tool systems.

A machine tool system as used herein is defined as a system which includes a machine tool apparatus which supports a blank and through various operations removes material to generate a part and a controller which controls the operation of the machine tool apparatus. Exemplary parts include finished components and molds. Exemplary machine tool systems include mills and lathes. Exemplary machine tools systems include the VM Series machining centers, the VMX Series machining centers, the 5-axis and horizontal Series machining centers, the TM6 lathe, the TM 8 lathe, the TM 10 lathe, the TMM 8 lathe, and the TMM 10 lathe, each of which are available from Hurco Companies located at One Technology Way in Indianapolis, Ind. 46268.

In one embodiment, first representative facility 102 and plurality of machine tool system 110 are associated with the same entity or related entities. In one embodiment, first representative facility 102 and plurality of machine tool system 110 are not associated with the same entity or related entity. In either case, machine tool system 106, machine tool system 108, machine tool system 112, and machine tool system 114 are associated with the same machine tool provider 116. The entit(ies) related to a given set of machine tool systems are referred to herein as a customer.

Machine tool provider 116 provides remote monitoring, remote communication, and remote control of the respective machine tool systems. Machine tool provider 116 may be the entity or entities which manufactured the respective machine tool systems, may be the entity or entities that leased or sold the respective machine tool systems, may be the entity or entities that provides maintenance or service for the respective machine tool systems, or may be the entity or entities which provides remote monitoring, remote communication, and remote control of the respective machine tool systems or an agent of any of the above.

Further, a given set of machine tool systems, being a single machine tool system, a plurality of machine tool systems, a subset of the machine tools systems at one or more facilities, or all of the machine tools at one or more facilities, are associated with a respective set of users which need to be informed of the operation of the given set of machine tool systems. For example, assuming that first representative facility 102 includes five machine tool systems (1-5 in table I), various users may be need to be informed of the operation of one or more of these five machine tool systems.

TABLE I

Machine tool systems and associated users

| | Machine Tool Systems | | | | |
|---|---|---|---|---|---|
| User | 1 | 2 | 3 | 4 | 5 |
| Machine Tool System Operator A | X | | X | | |
| Machine Tool System Operator B | | X | | X | X |
| Manager | X | X | X | X | X |
| Sales Team Member A | X | X | | | |
| Service Technician | X | X | X | X | X |
| Warranty Representative | X | | X | X | X |
| Machine Tool Provider Engineer | X | X | X | X | X |

Referring to Table I, Machine Tool Operator A needs to be informed of the operation of machine tool system 1 and machine tool system 3 because these are the two machine tools on which jobs related to Machine Tool Operator A are being executed. Machine Tool Operator B needs to be informed of the operation of machine tool system 2, machine tool system 4, and machine tool system 5 because these are the three machine tools on which jobs related to Machine Tool Operator B are being executed. Manager, such as a production manager or engineering manager, needs to be informed of the operation of machine tool systems 1-5 because the Manager is overseeing the operation of each machine tool system 1-5. Sales Team Member A needs to be informed of the operation of machine tool system 1 and machine tool system 2 because these are the two machine tools on which jobs related to Sales Team Member A's customer accounts are being executed. Service Technician needs to be able to observe the operation of machine tool systems 1-5 and to receive alerts about machine tool system. Machine Tool Provider Engineer, such as a help line engineer, needs to be able to observe the operation of machine tool systems 1-5 to field questions regarding each of machine tool systems 1-5. Warranty Representative needs to be able to observe the operation of machine tool systems 1, and 3-5 because these are the only machine tool systems currently under a warranty protection plan. The machine tool systems associated with each member of the set of users may be stored in a database accessible by machine tool provider 116. As explained herein, even though a user has the ability to be informed about the operation of a given machine tool system, the user may limit the amount of information that is communicated about the machine tool system.

As discussed herein, each of the respective machine tool systems are able to communicate with a remote controller 296 of machine tool provider 116 through a network 150. In addition, each of the users has a corresponding user system 160 which is able to communicate with remote controller 296 through a network 162. Exemplary user systems 160 include desktop computers, laptop computers, tablet computers, portable hand-held communication devices (such as BLACKBERRY devices), pagers, cellular telephones, and other devices capable of communicating over network 162. In one embodiment, the respective machine tool system or user system 160 is able to access the other of the respective machine tool system or user system 160.

Figure 2:
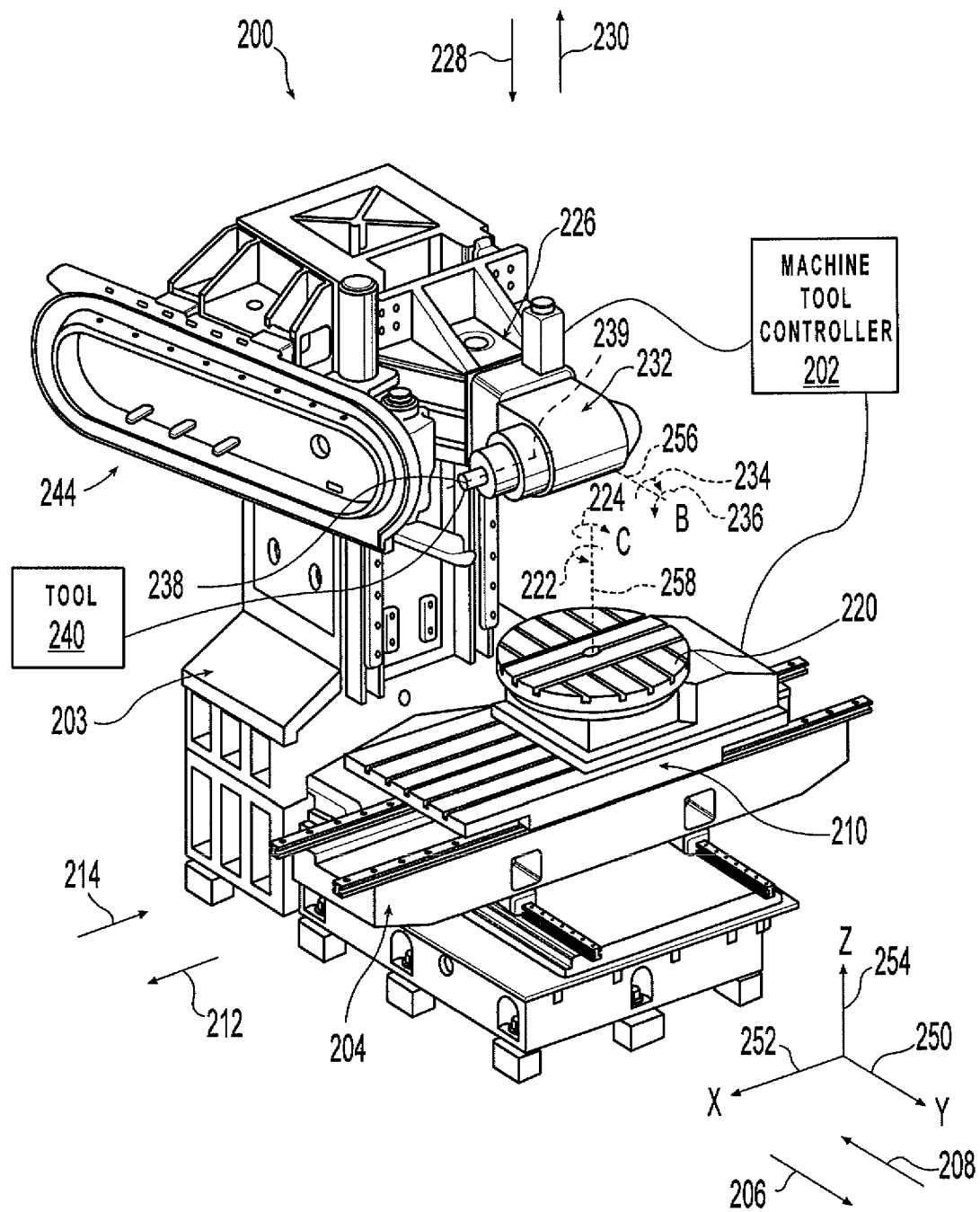
FIG. 2 is a representative view of an exemplary machine tool apparatus.

The respective machine tool systems may each have different configuration and degrees of freedom. Referring to FIG. 2, an exemplary machine tool system 106 is illustrated. machine tool system 106 includes a machine tool apparatus 200 having an associated machine tool controller 202. Machine tool apparatus 200 includes a frame 203 having a first saddle 204 coupled thereto. Saddle 204 is translatable in directions 206 and 208. A second saddle 210 is supported by first saddle 204. Saddle 210 is translatable in directions 212 and 214 relative to saddle 204. A platform 220 is supported by saddle 210 and is rotatable relative to saddle 210 in directions 222 and 224. In one embodiment, each of saddle 204, saddle 210, and platform 220 are moveable through motors which are controlled by machine tool controller 202.

Further, a third saddle 226 is supported by frame 203. Saddle 226 is translatable in directions 228 and 230. Saddle 226 supports a rotatable member 232. Rotatable member 232 is rotatable in directions 234 and 236 relative to saddle 226. In one embodiment, each of saddle 226 and rotatable member 232 are moveable through motors which are controlled by machine tool controller 202.

A tool spindle 238 is supported by saddle 226. Various tools 240 may be coupled to tool spindle 238 to perform various operations with machine tool apparatus 200. Exemplary tools include and an end mill, a drill, a tap, a reamer, and other suitable tools. Tool spindle 238 is rotatable about a tool spindle axis 239 to input a rotation to the tool 240. In one embodiment, a plurality of tools 241 are stored in a tool carousal 244. Additional details about an exemplary tool carousal 244 are provided in U.S. patent application Ser. No. 11/890,384, the disclosure of which is expressly incorporated by reference herein.

The movement of saddle 204 in direction 206 or direction 208 is illustrated as a movement in an y-axis 250. The movement of saddle 210 in direction 212 or direction 214 is illustrated as a movement in an x-axis 252. The movement of saddle 226 in direction 228 and direction 230 is illustrated as a movement in an z-axis 254. The rotation of rotatable member 232 in direction 234 or direction 236 is illustrated as a movement in an B-axis 256. The rotation of platform 220 in direction 222 or direction 224 is illustrated as a movement in an C-axis 258. Machine tool apparatus 200 is an exemplary 5-axis machine. Additional exemplary machine tool systems may have more or less axes, including a 3-axis machine and a 4-axis machine.

Through the movement of one or more of the 5-axes of machine tool apparatus 200 a tool 240 may be positioned relative to a part 260 supported by platform 220 to be machined. Part 260 may be secured to platform 220 to maintain the position of part 260 to platform 220. The movement of one or more of the 5-axes of machine tool apparatus 200 is controlled through machine tool controller 202.

Figure 3:
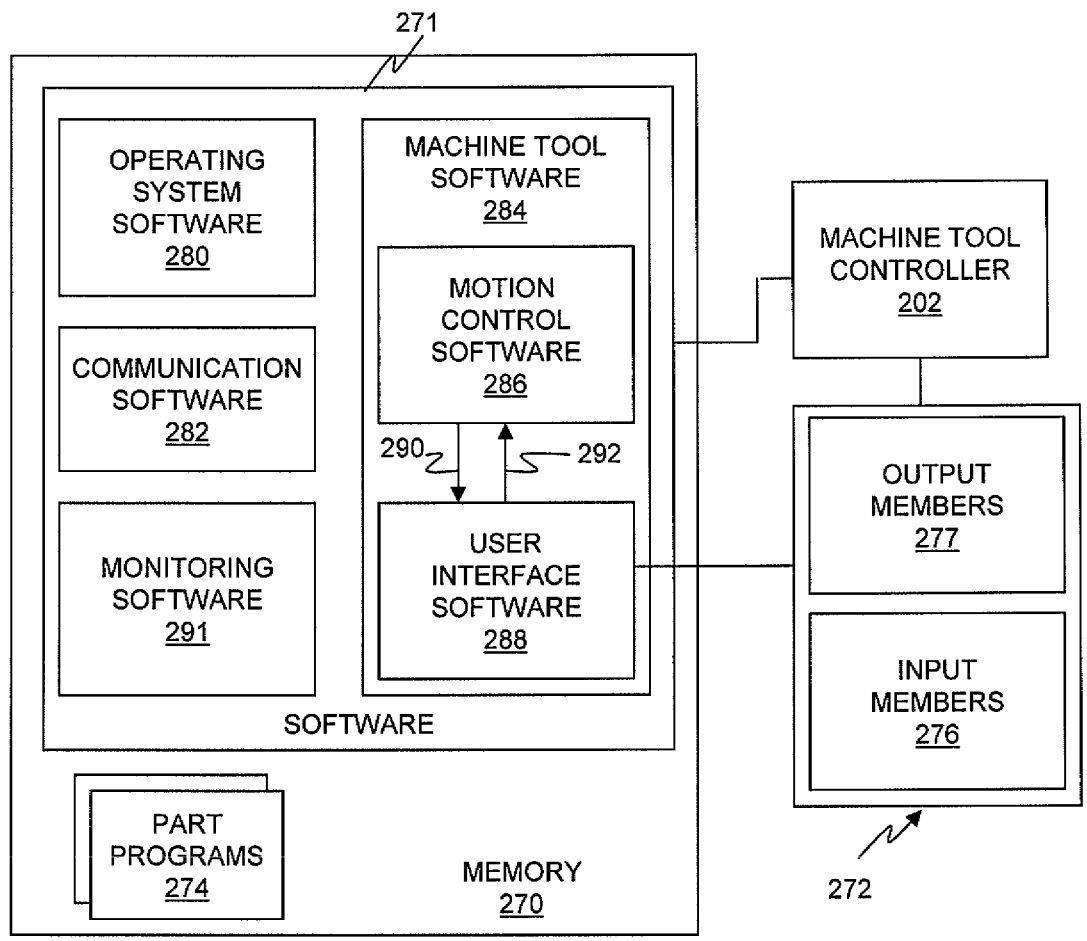
FIG. 3 is a representative view of a machine tool controller, associated memory and I/O modules.

Referring to FIG. 3, machine tool controller 202 is operatively coupled to a memory 270 having software 271 stored thereon and is operatively coupled to one or more I/O modules 272. Machine tool controller 202 may be any type of computing device which may execute software 271. Further, machine tool controller is not limited to being a single computing device, but rather may be a collection of computing devices, within the machine tool system 106 and/or computing devices accessible over a network, which together execute software 271 to perform the methods disclosed herein.

Memory 270 is accessible by machine tool controller 202. Memory 270 is a computer-readable medium and may be a single storage device or may include multiple storage devices, located either locally with the machine tool system or accessible across a network. Computer-readable media may be any available media that is accessible by machine tool controller 202 and includes both volatile and non-volatile media. Further, computer-readable media may include one or both of removable and non-removable media. By way of example, computer-readable media may include, but is not limited to, RAM, ROM, EEPROM, flash memory or other memory technology, hard drives, CD-ROM, Digital Versatile Disk (DVD) or other optical disk storage, magnetic cassettes, magnetic tape, magnetic disk storage or other magnetic storage devices, or any other medium which may be used to store information and which may be accessible by machine tool controller 202.

Exemplary I/O modules 272 includes input members 276 and output members 277 which collectively provide a user interface of the machine tool system 106. Exemplary input members include a touch display, a keyboard, a mouse, a trackball, a touch pad, one or more buttons or switches, a CD drive, a floppy drive, a USB port, an interface to a network (wireless or wired), and other suitable devices for providing information to machine tool controller 202. Exemplary output members include a display, lights, a printer, and other suitable devices for presenting information.

Software 271 includes an operating system 280. An exemplary operating system 280 is a WINDOWS operating system available from Microsoft Corporation of Redmond, Wash. Memory 271 further includes communication software 282. Communication software provides machine tool controller 202 with the ability to communicate with other devices across one or more networks. Exemplary networks include wired networks, wireless networks, cellular networks, local area networks, wide area networks, public switched networks, any other system whereby two or more computing devices may communicate, and combinations thereof. An exemplary public switched network is the Internet. Exemplary communication software 112 includes e-mail software, Internet browser software, and other types of software which permit machine tool controller 202 to communicate with other devices across a network.

Memory 270 further includes machine tool software 284. Exemplary machine tool software 284 is the WINMAX brand machine tool software available from Hurco Companies, Inc. located at One Technology Way in Indianapolis, Ind. Machine tool software 284 is capable of reading a one or more part programs 274 which provide the desired tool paths for machine tool apparatus 200 or the desired geometry of a part 260 to be made by machine tool apparatus 200.

Machine tool software 284 illustratively includes motion control software 286 and user interface software 288. Motion control software 286 interacts with the axis controllers 370, 372, 374, 376, and 378 of respective axis 250, 252, 254, 256, and 258 of machine tool apparatus 200 to control the movement of each of 250, 252, 254, 256, and 258, interacts with tool carousel 244 to select the appropriate tool 240 for use with each operation, the speed of the tool spindle 238, and other parameters of machine tool apparatus 200. In one embodiment, motion control software 286 is a real time software module which is based on RTX extension to WINDOWS available from Ardence, located at 14 Crosby Drive in Bedford, Mass. 01730-1451. Exemplary motion control software 286 is disclosed in U.S. Pat. No. 5,453,933, U.S. Reissue Pat. RE39,907; U.S. patent application Ser. No. 11/277,286; U.S. patent application Ser. No. 11/277,291; U.S. patent application Ser. No. 11/277,305; U.S. patent application Ser. No. 11/833,958; and U.S. patent application Ser. No. 11/833,971, the disclosures of which is expressly incorporated by reference herein.

User interface software 288 interacts with input members 276 and the output members 277 to receive and process inputs through I/O modules 272 and/or communication software 282 and to provide outputs to the output members 277 and remote devices through communication software 282.

In one embodiment, motion control software 286 and user interface software 288 are apart of a single software package. In one embodiment, motion control software 286 and user interface software 288 are separate software packages which communicate with each other. In the illustrated embodiment, motion control software 286 and user interface software 288 are separate software packages which pass information back and forth as represented by line 290 and line 292. In one embodiment, motion control software 286 is a real time application while user interface software 288 is an interrupt based application.

Machine tool controller 202 receives input data, such as a part program 274 which may also be stored on memory 270 and provides output data, such as position data for the various axes 250, 252, 254, 256, and 258 of machine tool apparatus 200. In one embodiment, machine tool controller 202 receives part program 274 through one or more I/O modules 272. In one embodiment, user interface software 288 receives the part program 274 and provides a representation of the part program 274 to motion control software 286 for interpretation and execution.

In one embodiment, part program 274 is entered through a conversational mode of operation whereby a user during a programming session is presented with one or more screens through a user interface (such as a touch screen and keyboard of I/O modules 272). An exemplary method of conversational programming is disclosed in U.S. Pat. No. 5,453,933, assigned to the assignee of the current application, the disclosure of which is expressly incorporated by reference herein. During the programming session, the user may program the desired geometry for the machined part 260 and specify one or more attributes. In one example, the user specifies the desired geometry for the machined part 260 by creating blocks of code each of which specifies a tool and a trajectory of the tool. As such, the geometry of the machined part 260 is defined based on the operations used to create the machined part.

In one embodiment, part program 274 is provided through a NC mode of operation whereby an NC program is loaded into machine tool controller 202. Part programs 274 are frequently expressed in a standard G&M code language, or a close derivative of this language based on either the International Standards Organization (ISO) or the Electronics Industries Association (EIA) RS-274-D, using codes identified by letters such as G, M, F. The codes define a sequence of machining operations to control motion in the manufacture of a part 260. Machine tool controller 202 converts the codes to provide location positions for the various axes 250, 252, 254, 256, and 258 of machine tool apparatus 200. In one embodiment, part program 274 is parsed by a parser of machine tool controller 202 which reviews the part program 274 and identifies various geometry segments. Exemplary geometry segments include lines, arcs, splines and other suitable types of segments.

Regardless of the origin of part program 274, part program 274 defines the desired geometry for the machined part 260 either directly or based on the operations used to create the part 260. However, part program 274 may not specify the positions of saddles 204, 210, and 226 nor the rotations of platform 220 and rotatable member 232. These positions are determined by machine tool controller 202. A user of the machine tool system (or user interface 450 discussed herein) may select one or more of the part programs 274 stored on memory 270 for uploading to memory 294 of remote controller 296 for storage as a backup copy of the one or more part programs 274.

Memory 270 further includes monitoring software 291 which is discussed herein. Monitoring software 291 of machine tool system 106 communicates with a remote monitoring software 293 across a network 150. Remote monitoring software 293 is executed by a remote controller and is provided on a memory 294 which is accessible by remote controller 296. Exemplary remote controllers include a server or any other computing device capable of communicating with machine tool controller 202 over network 150. Remote controller 296 may be a single computing device or may be a plurality of computing devices.

In one embodiment, monitoring software 291 through communication software 282 initiates a data connection with monitoring software 293. By having machine tool controller 202 initiate the connection with remote controller 296, remote controller 296 does not require knowledge of the facility network interface 120 of the respective first representative facility 102. Facility network interface 120 includes the firewalls, routers, and other network and security components positioned between machine tool systems 106 and 108 (and other networked devices of the facility) and network 150. It is very likely that a facility network interface 122 of facility 110 has different topology and security than facility network interface 120. As such, by having the respective machine tool controllers initiate the connection with remote controller 296, remote controller 296 does not need to have knowledge of the specifics of each of facility network interface 120 and facility network interface 122.

As remote controller is in communication with machine tool systems from different customers, each having their own internal network security provisions, by having the machine tool system contact the remote controller 296 the machine tool provider 116 does not require knowledge of each customer's network settings. This allows remote controller 296 to communicate with each of machine tool system 106 and machine tool system 108 of first representative facility 102 and machine tool system 112 and machine tool system 114 of second representative facility 110 even though each of first representative facility 102 and second representative facility 110 have different security measures in place. In one embodiment, the data connection is a one-way connection in that machine tool controller 202 simply pushes information to remote controller 296 which is then stored in one or more databases 298. In one embodiment, the data connection is a two-way connection in that machine tool controller 202 may push data to remote controller 296, but remote controller 296 may also send communications to machine tool controller 202 such as to change parameter values associated with the machine tool system 106, set events to monitor for, request information, and perform additional tasks. In one embodiment, the two-way data connection is established by the machine tool system during system startup as discussed herein.

Figure 4:
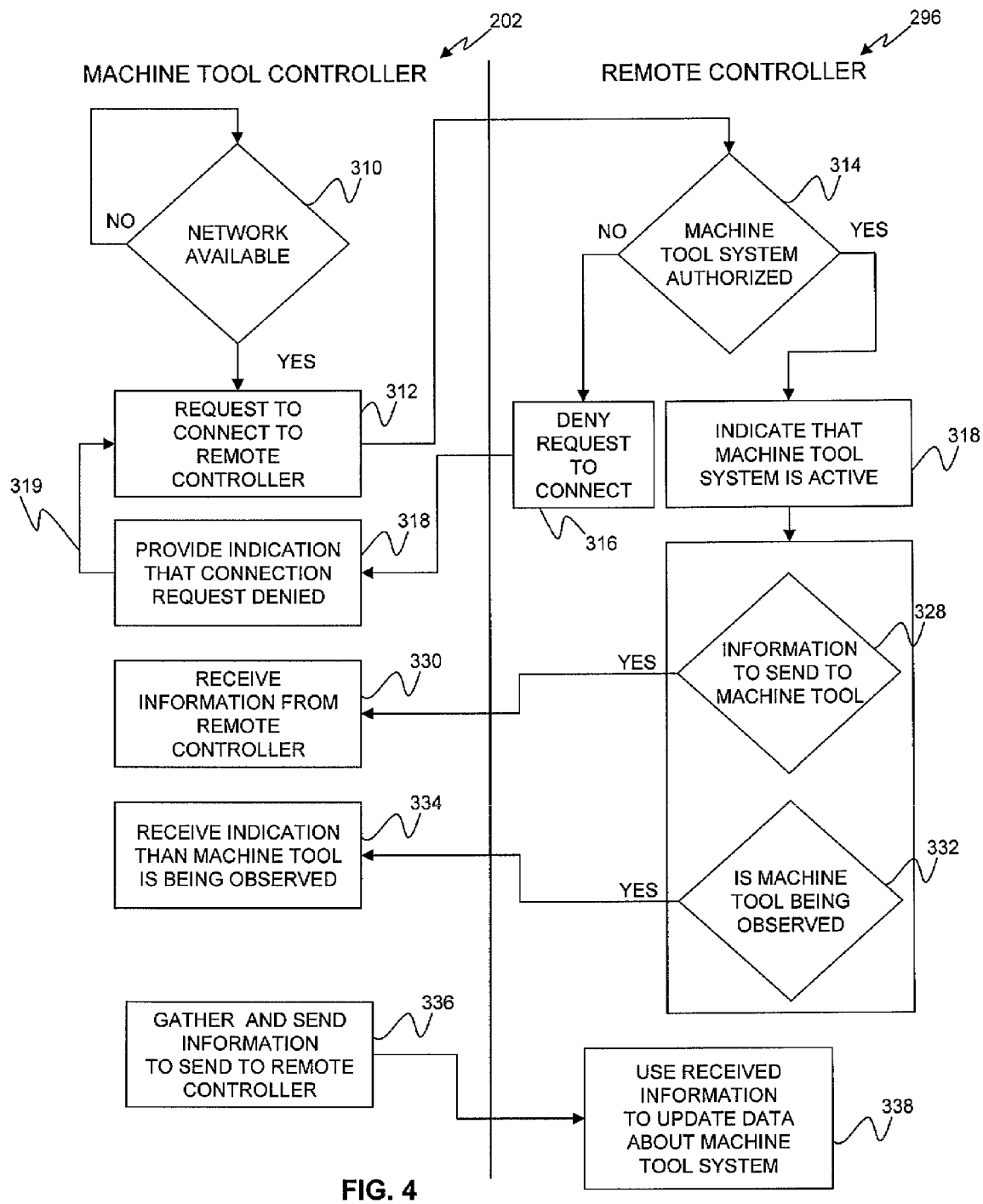
FIG. 4 is a representative view of interactions between a machine tool controller of a machine tool system and a remote controller of the system of FIG. 1.

Referring to FIG. 4, the interaction between machine tool controller 202 and remote controller 296 is represented. Machine tool controller 202 when the machine tool system 106 is powered up checks to see if a network is available as represented by block 310. If a network is not available, machine tool controller 202 continues to query for available networks over time. Irrespective of whether a network is available, machine tool system may operate as a stand alone system. As such, the machine tool system inability to connect to remote controller 296 will not impede the machine tool system from executing one or more part programs 274.

If a network is detected, machine tool controller 202 attempts to connect to remote controller 296 as represented by block 312. Remote controller 296 receives the request to connect from machine tool controller 202 and determines whether the machine tool system 106 is authorized to connect to remote controller 296, as represented by block 314. In one embodiment, the request from machine tool controller 202 includes a machine identification number which identifies the machine tool system 106 which the machine tool controller 202 is associated. One exemplary machine identification number is based on unique information of the machine tool system 106 itself Exemplary unique information includes a hard drive serial number of memory 270, a hardware address of the machine tool system 106, and an install time of operating system software 280 of the machine tool system.

Exemplary machine tool identification numbers are disclosed in U.S. patent application Ser. No. 12/103,680, filed Apr. 15, 2008 titled SOFTWARE OPTIONS SELECTION AND VALIDATION SYSTEM, the disclosure of which was expressly incorporated by reference herein. The machine tool identification number is also stored in memory 294 associated with remote controller 296. If the machine identification information received in the request from machine tool controller 202 does not match a machine identification number stored in memory 294 associated with remote controller 296, remote controller 296 sends a communication to machine tool controller 202 that the request to connect has been denied, as represented by block 316.

In response thereto, machine tool controller 202 provides an indication to an operator of the machine tool system 106 that the requested connection to remote controller 296 has been denied, as represented by block 318. Machine tool controller 202 may continue to still attempt to connect to remote controller 296 as represented by line 319. In one embodiment, these additional requests to connect to remote controller 296 are performed automatically. In one embodiment, these additional requests to connect to remote controller 296 are based on input received from an operator of the machine tool system 106.

If the machine identification number received from machine tool controller 202 matches a machine tool identification number stored in memory 294 associated with remote controller 296 then a data connection between machine tool controller 202 and remote controller 296 is established. In one embodiment, this data connection is a two way data connection which permits information to be passed from machine tool controller 202 to remote controller 296 as well as information to pass from remote controller 296 to machine tool controller 202.

In response to machine tool controller 202 connecting with remote controller 296, remote controller 296 updates a status of machine tool system 106 as active, as represented by block 318. In one embodiment, the status of machine tool system 106 is stored in a database 298 stored on memory 294.

Figure 5:
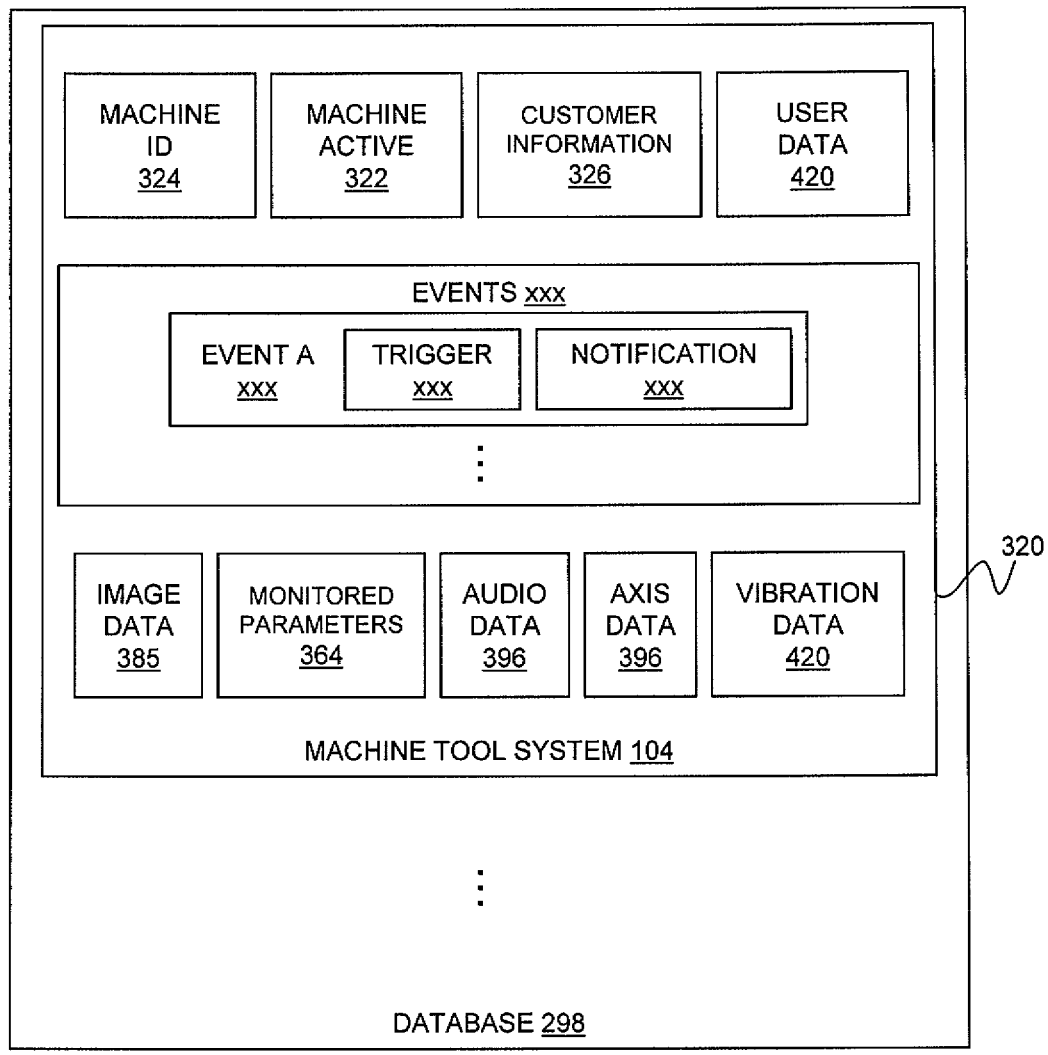
FIG. 5 is a representative view of a database accessible by the remote controller of the system of FIG. 1.

Referring to FIG. 5, an exemplary collection of information 320 about machine tool system 106 stored in database 298 is shown. In one embodiment, the collection of information is stored in various tables of databases 298. As shown, part of the collection of information 320 regarding machine tool system 106 is an indication of whether the machine is active or not, as represented by block 322. Also the machine ID is included, as represented by block 324. Customer information is included, as represented by block 326. Exemplary customer information includes name and address of the customer contact information users and passwords and other information related to the customer. User information, such as access to machine tool system 106, is included, as represented by block 420.

Returning to FIG. 4, remote controller 296 checks to see if it has information to send to the machine tool controller 202 as represented by block 328. As explained here, exemplary information may include files such as part programs 274 to be provided to machine tool controller 202, updated parameter values to associate with machine tool system 106, and parameters to add to a watch list. If remote controller 296 has information to send to a machine tool controller 202, machine tool controller 202 receives this information from the remote controller 296, as represented by block 330, and then performs any steps required. In one example, the information sent from remote controller 296 to machine tool controller 202 is a parameter to monitor with monitoring software 291. As such machine tool controller 202 adds this parameter to a listing of parameters being monitored.

In addition, remote controller 296 provides an indication to machine tool controller 202 of whether the machine tool system 106 is being observed by one or more remote users, as represented by block 332. As explained herein, remote users have the ability to connect to remote controller 296 and to view information regarding the machine tool system 106. If the machine tool system 106 is being observed, machine tool controller 202 receives an indication that the machine tool system 106 is being observed, as represented by block 334. In one embodiment machine tool system 106 provides an indication to an operator that the machine tool system 106 is being observed.

In response to machine tool controller 202 being connected to remote controller 296, machine tool controller 202 gathers and sends information to remote controller 296, as represented by block 336. Remote controller 296 receives the information sent by machine tool controller 202 and updates the database information regarding the machine tool system 106, as represented by block 338.

Figure 6:
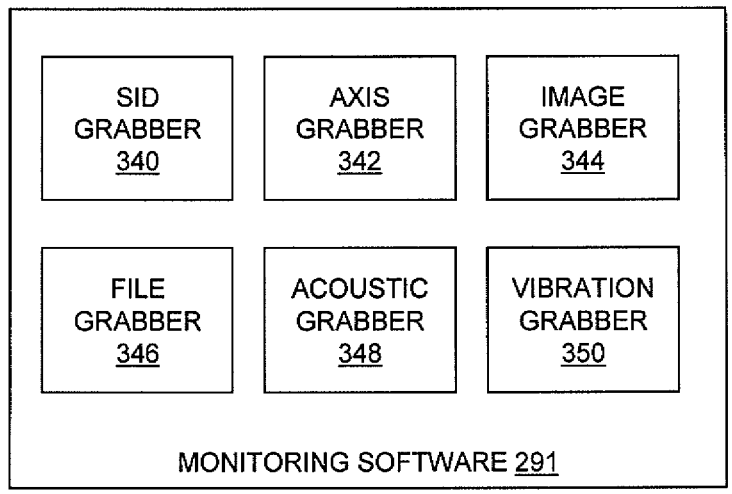
FIG. 6 is a representative view of a monitoring software accessible by the machine tool controller of FIG. 3.

Referring to FIG. 6, a representation of monitoring software 291 is shown. Monitoring software 291 may be represented as a plurality of grabbers which obtain the information to be monitored and/or sent to remote controller 296. Exemplary grabbers include a software identifier (SID") grabber 340, an axis grabber 342, an image grabber 344, a file grabber 346, an acoustic grabber 348, and a vibration grabber 350. An explanation of each of these exemplary grabbers is provided herein.

Figure 7:
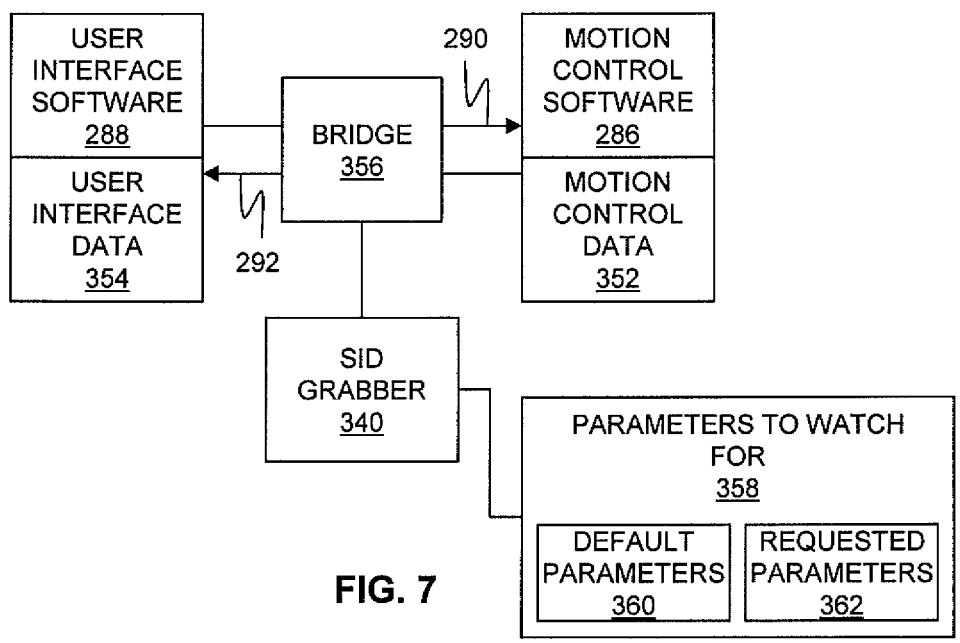
FIG. 7 is a representative view of the monitoring software accessible by the machine tool controller which monitors for parameter values related to a motion control software accessible by the machine tool controller of FIG. 3.

Referring to FIG. 7, an exemplary SID grabber 340 is shown. As mentioned herein, machine tool software 284 includes motion control software 286 and user interface software 288. As mentioned herein, information is exchanged between motion control software 286 and user interface software 288, as represented by lines 290 and 292. This exchanged information may be thought of as motion control data 352 and user interface data 354. SID grabber 340 monitors the information exchanged between motion control software 286 and user interface software 288 as represented by bridge 356. In particular, the SID grabber 340 through bridge 356 looks to see if various values for parameters it is watching are passed between motion control software 286 and user interface software 288. The parameters to watch 358 include default parameters 360 which are always monitored by monitoring software 291 and requested parameters 362 which are additional parameters requested to be monitored by remote controller 296. If a value of one of the parameters to watch 358 is passed between motion control software 286 and user interface software 288, SID grabber 340 copies the value of that parameter and stores it for sending to remote controller 296. The values of the monitored parameters are stored in database 298, as represented by block 364 in FIG. 5.

Figure 8:
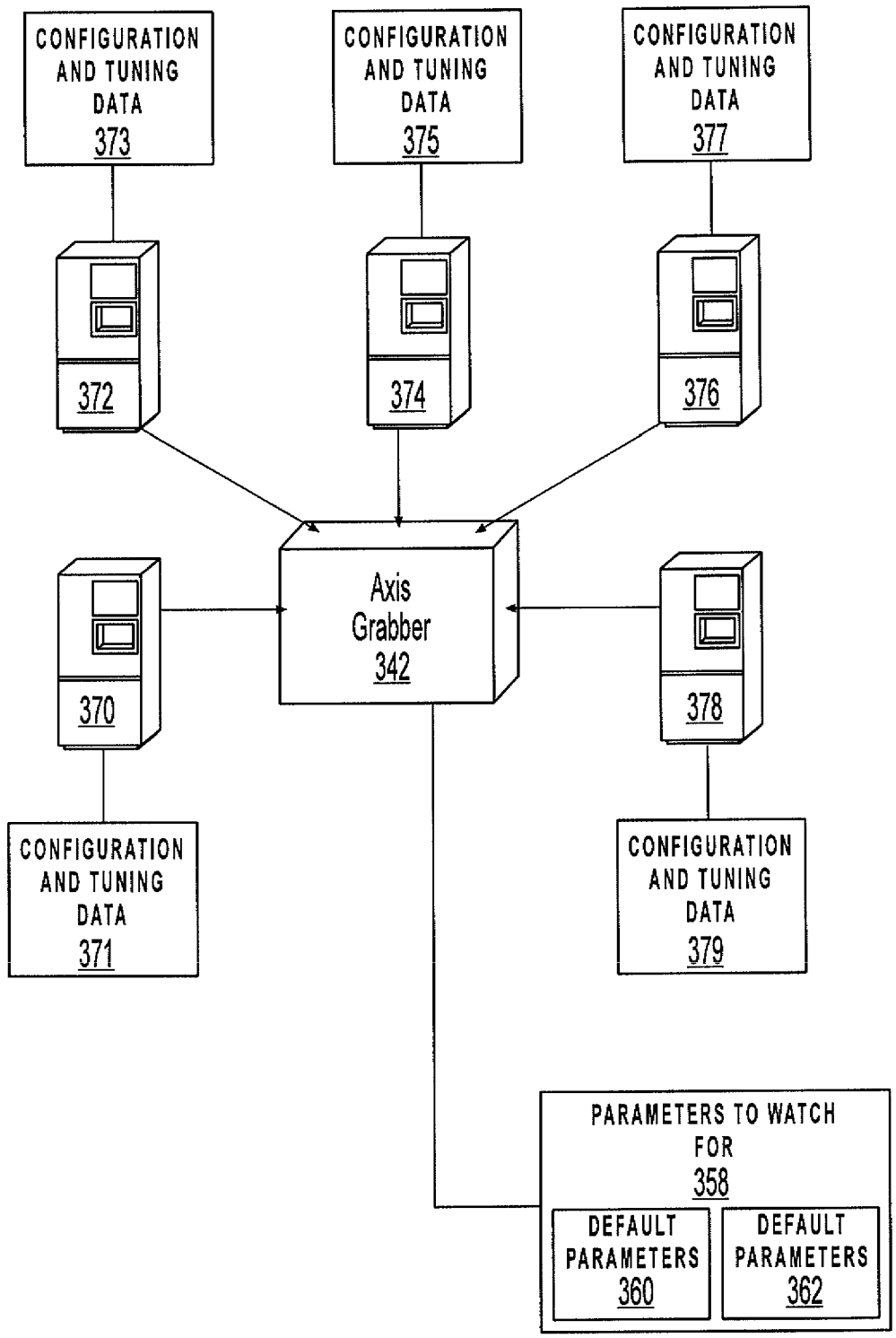
FIG. 8 is a representative view of the monitoring software accessible by the machine tool controller which monitors a plurality of axis controllers of the machine tool system associated with the machine tool controller of FIG. 3.

Referring to FIG. 8, a representation of an exemplary axis grabber 342 is shown. Axis grabber 342, like SID grabber 340, has access to a listing of the parameters to watch 354. Axis grabber 342 communicates with the machine tool systems axis controllers, such as servo-amplifiers, and extracts configuration and tuning data therefrom. Each of axis 250, 252, 254, 256, and 258 have a respective axis controller 370, 372, 374, 376 and 378. The data regarding this configuration and tuning data 371, 373, 375, 377, and 379 of the axis controllers 370, 372, 374, 376 and 378. is gathered and transmitted to remote controller 296 and is stored in database 298 as represented by the block 396 as shown in FIG. 5.

Figure 9:
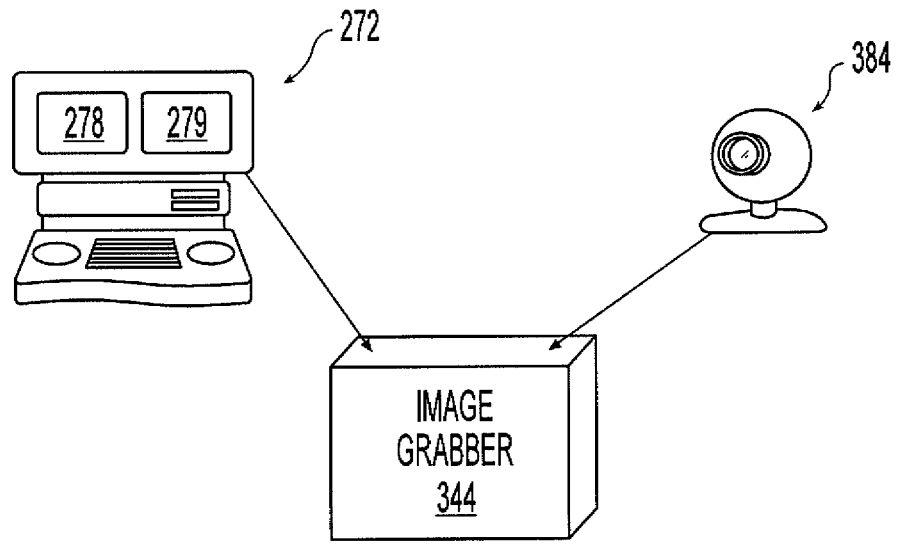
FIG. 9 is a representative view of the monitoring software accessible by the machine tool controller which monitors images of one or more cameras and one or more displays of an I/O modules of the machine tool system associated with the machine tool controller of FIG. 3.

Referring to FIG. 9, image grabber 344 is represented. Image grabber 344 gathers image information from one or more cameras 384 and I/O modules 272. Exemplary cameras include still image cameras and video cameras. In one embodiment, cameras 384 are mounted on mounts that permit the orientation of the camera to be changed based on input from remote controller 296. As shown in FIG. 9, in one embodiment, I/O modules 272 include a first display 278 and a second display 279. In one embodiment image grabber captures either a screen shot of display 278 or a screenshot of display 279, or a screen shot of both display 278 and 279. Image grabber 344 provides the stored images to the remote controller 296. The image data is stored in database 298 by remote controller 296 as represented by block 385 in FIG. 5. In the illustrated embodiment, the images provided to remote controller 296 provide a passive look at the current operation of the machine tool system. In one embodiment, a user of remote controller 296 is able to proxy onto the machine tool system and take active control of the current operation of the machine tool system. In this manner, a remote technician may actively change settings of the machine tool system.

Figure 10:
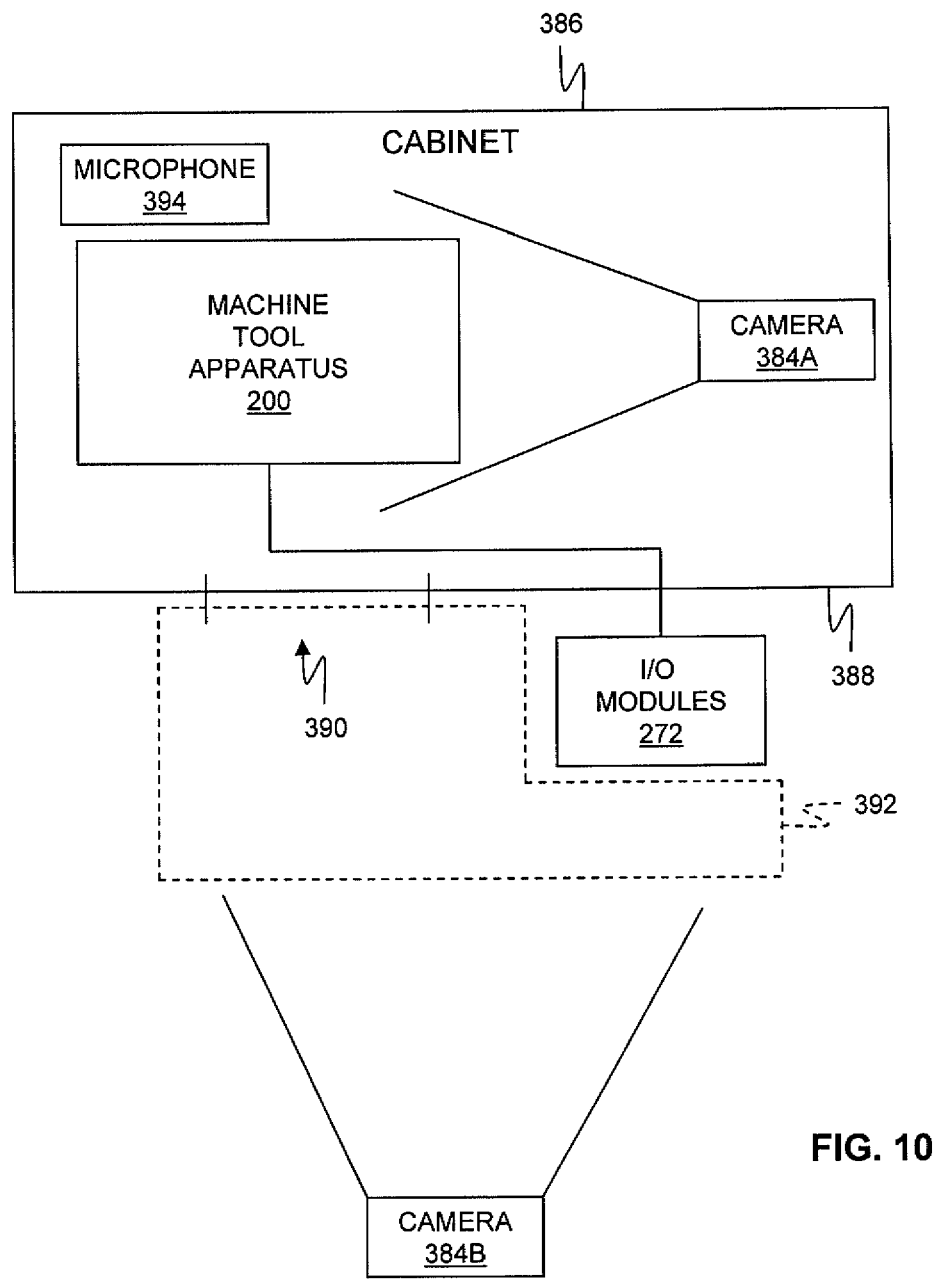
FIG. 10 is a representative view of the location of one or more cameras of the machine tool system associated with the machine tool controller of FIG. 3.

Referring to FIG. 10, machine tool apparatus 200 is shown housed in a cabinet 386. Cabinet 386 protects operators from the moving components of machine tool apparatus 200. On a front side 388 of cabinet 386, I/O modules 272 are provided. Further, a door 390 is provided in cabinet 386 permitting access to machine tool apparatus 200 by an operator. In general, an operator remains in an operator area 392 represented by the dash lines in FIG. 10. A first camera 384A is positioned inside of cabinet 386 and is directed to view the operation of machine tool apparatus 200. A second representative camera 384B is shown monitoring operator area 392 on an exterior of cabinet 386. As such with image grabber 344, a remote viewer may observe the information viewable by an operator on display as 278 and 279, the actions being taken by an operator with camera 384B and actions being taken by machine tool apparatus 200 with camera 384A. In this manner a service technician may observe the steps being taken by the machine tool operator to make sure the requested steps (provided by the technician, such as over the phone) are being carried out.

Figure 11:
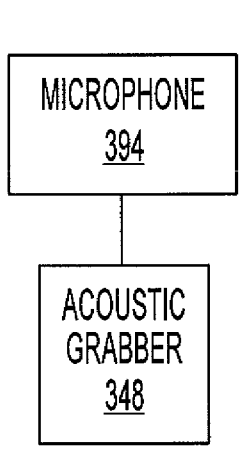
FIG. 11 is a representative view of the monitoring software accessible by the machine tool controller which monitors one or more microphones of the machine tool system associated with the machine tool controller of FIG. 3.

Referring to FIG. 11, a representation of acoustic grabber 348 is shown. Acoustic grabber 348 monitors the output of a microphone 394 and provides a representation of that audio information to remote controller 296. The received audio data is stored in database 298 as represented by block 296 in FIG. 5. Referring to FIG. 10, microphone 394 is shown placed within cabinet 386 and proximate to machine tool apparatus 200.

Figure 12:
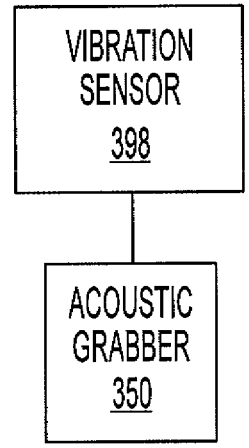
FIG. 12 is a representative view of the monitoring software accessible by the machine tool controller which monitors a one or more vibration sensors of the machine tool system associated with the machine tool controller of FIG. 3.

Referring to FIG. 12, a representation of vibration grabber 350 is shown. Vibration grabber 350 monitors one or more vibration sensors 398. The vibration information collected by vibration grabber 350 is provided to remote controller 296. Remote controller 296 stores vibration data in database 298 as represented by block 400 in FIG. 5.

Figure 13:
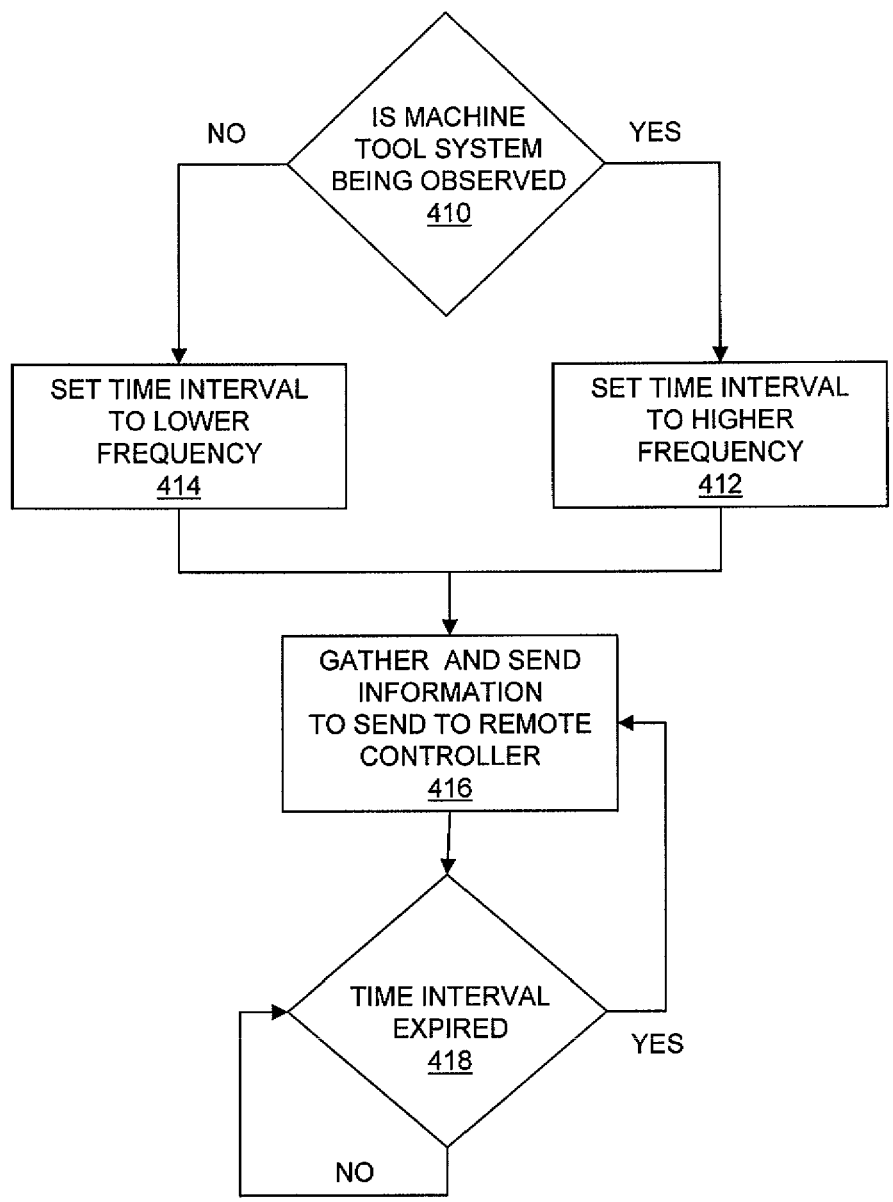
FIG. 13 is a representative view of the timing interval of information passed from the machine tool system to the remote controller of the system of FIG. 1.

Referring to FIG. 13, the transmission interval of data to remote controller 296 may be varied based on whether the machine tool system 106 is being observed or not. In one embodiment, each of the respective grabbers continues to grab the data it is monitoring for irrespective of the transmission interval to remote controller 296. In one embodiment, one or more of the grabbers alters the interval at which it monitors for information to coincide generally with the interval that such information is passed through remote controller 296. In one embodiment, at least a portion of the grabbers do not monitor and capture data unless specifically requested by remote controller 296. One example is file grabber 346 which only provides directory information of memory 270 to remote controller upon request.

As shown in FIG. 13, a determination is made whether the machine tool system 106 is being observed as represented by block 410. If the machine tool system is being observed the time interval for passing information to remote controller 296 is set to a higher frequency, as represented by block 412. If the machine tool system is not being observed, the time interval for passing information to remote controller 296 is set to a lower frequency as represented by block 414. In one embodiment, the higher frequency has a time interval of five seconds while the lower frequency has a time interval of about 12 hours. In one embodiment, the time interval spacing of the lower frequency is at least ten times the time interval spacing of the higher frequency. In one embodiment, the time interval spacing of the lower frequency is at least 100 times the time interval spacing of the higher frequency. For either time interval, machine tool controller 202 gathers the information collected by the grabbers and sends that information to remote controller 296 as represented by block 416. This is repeated for each time interval as represented by block 418. A change in the status of the machine tool being observed will result in the time interval that information is collected and/or sent to remote controller 296 to be adjusted. In the illustrated embodiment, image grabber 344 does not provide streaming video to remote controller 296, but rather images at the respective time intervals. In one embodiment, image grabber 344 provides streaming video to remote controller 296.

Returning to FIG. 1, one or more user systems 160 may communicate with remote controller 296 through one or more networks 162. Separate networks include wired networks, wireless networks, cellular networks, local area networks, wide area networks, public switch networks, and any other system whereby two or more computing devices may communicate, and in combination thereof Exemplary user systems 160 include general purpose computers, desktop computers, laptop computers, tablet computers, portable handheld communication devices (such as BLACKBERRY devices), pagers, cellular telephones, and other devices capable of communicating over network 162. In one embodiment of network 150 and network 162 include at least a portion of the same network system, such as the Internet.

In one embodiment, remote controller 296 provides a user interface 164 which is presented to a remote user through the respective user system 160. In the illustrated embodiment, user interface 164 is a collection of one or more web pages through which a user of the respective user system 160 may obtain information regarding one or more machine tool systems, provide input for events to monitor with respect to machine tool systems, and change the parameters and/or operation of the respective machine tool systems. The remote controller 296 only permits information about machine tool systems that the user is authorized to view. As such, remote controller 296 has information regarding machine tool systems for plurality for distinct customers, a user for a first customer may not see information regarding machine tool systems for another customer unless that operator has authorization to do so. Further, as mentioned in connection with Table I, a given user of a customer may not even be able to view all of the machine tool systems of that customer. In one embodiment, user information is stored in database 298, and is represented by block 420. This user information provides a listing of users who have access to receive information about respective machine tool system 106.

Figure 14:
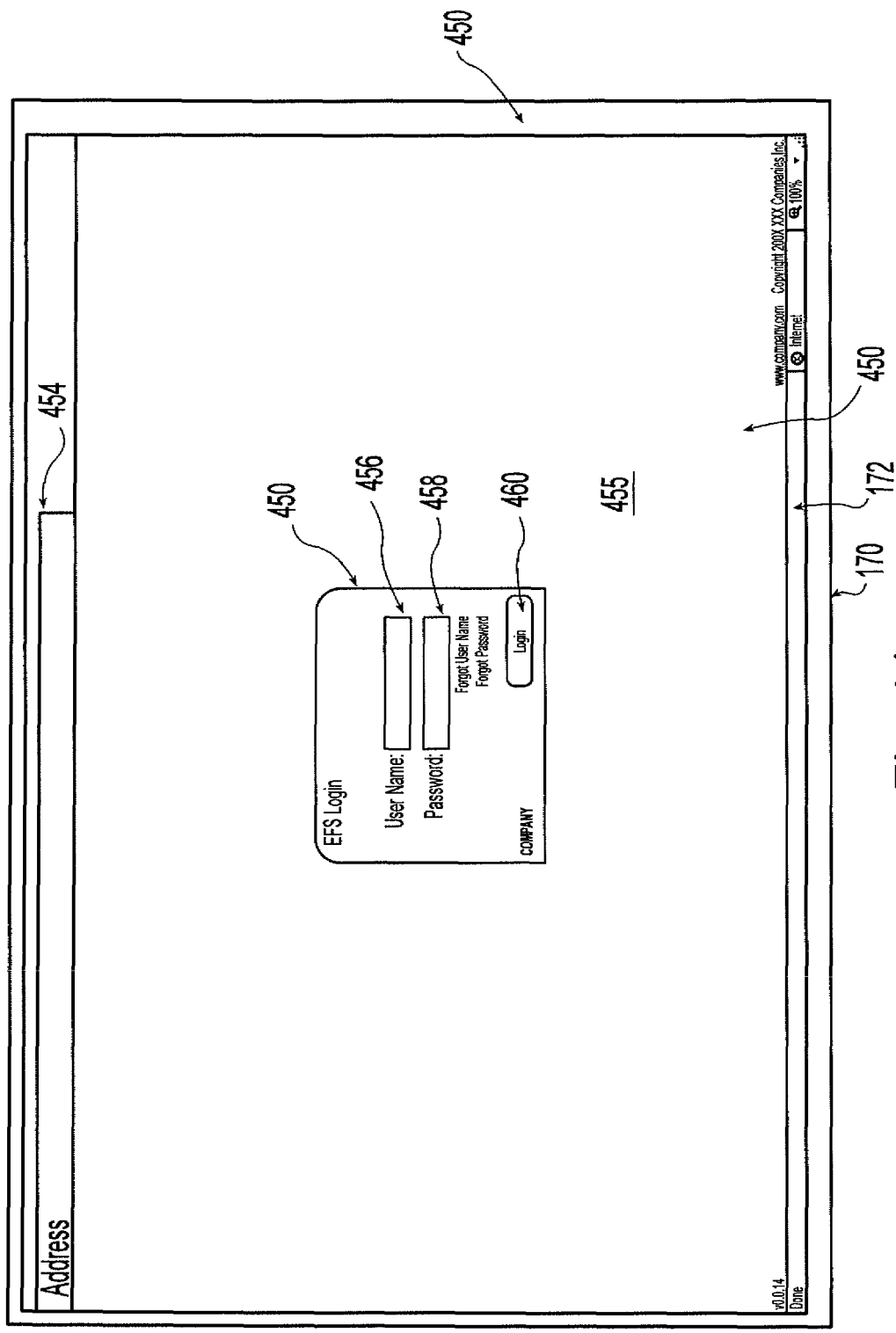
FIG. 14 is a representative view of a login screen of a user interface presented to a user by the user system of FIG. 1.

Referring to FIGS. 14-30 an exemplary embodiment of user interface 164, illustratively user interface 450, is shown. Referring to FIG. 14 a display 170 of user system 160 is shown. Display 170 is displaying a webpage 452 presented through a web browser 172 provided on user system 160. Webpage 452 has a corresponding address 454. Instructions related to web page 452 are provided by remote controller 296. Webpage 452 is configured to receive log in information from a user of user system 160. The user enters a user name in input 456 and a password in input 458. By selecting input 460 the entered user name and password is presented to remote controller 296 which based on user information 420 determines whether the supplied user name and password are for an authorized user. Other means of identifying a user of user system 160 may be used. Exemplary methods includes fingerprint identification, information provided on a magnetic card or token which is presented to user system 160, and other exemplary methods of identifying a user of user system 160.

Figure 15:
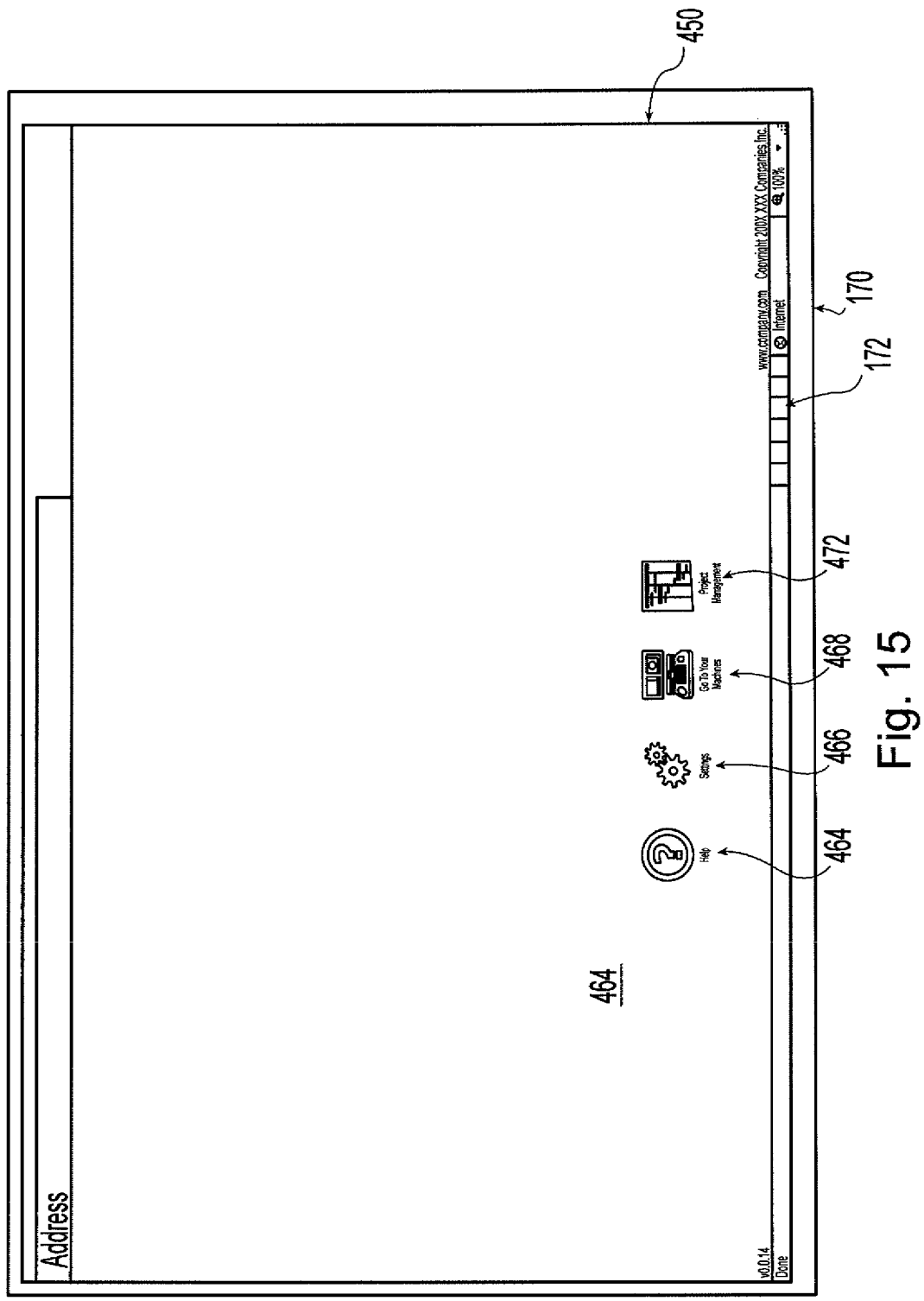
FIG. 15 is a representative view of a main screen of a user interface presented to a user by the user system of FIG. 1.
Figure 16:
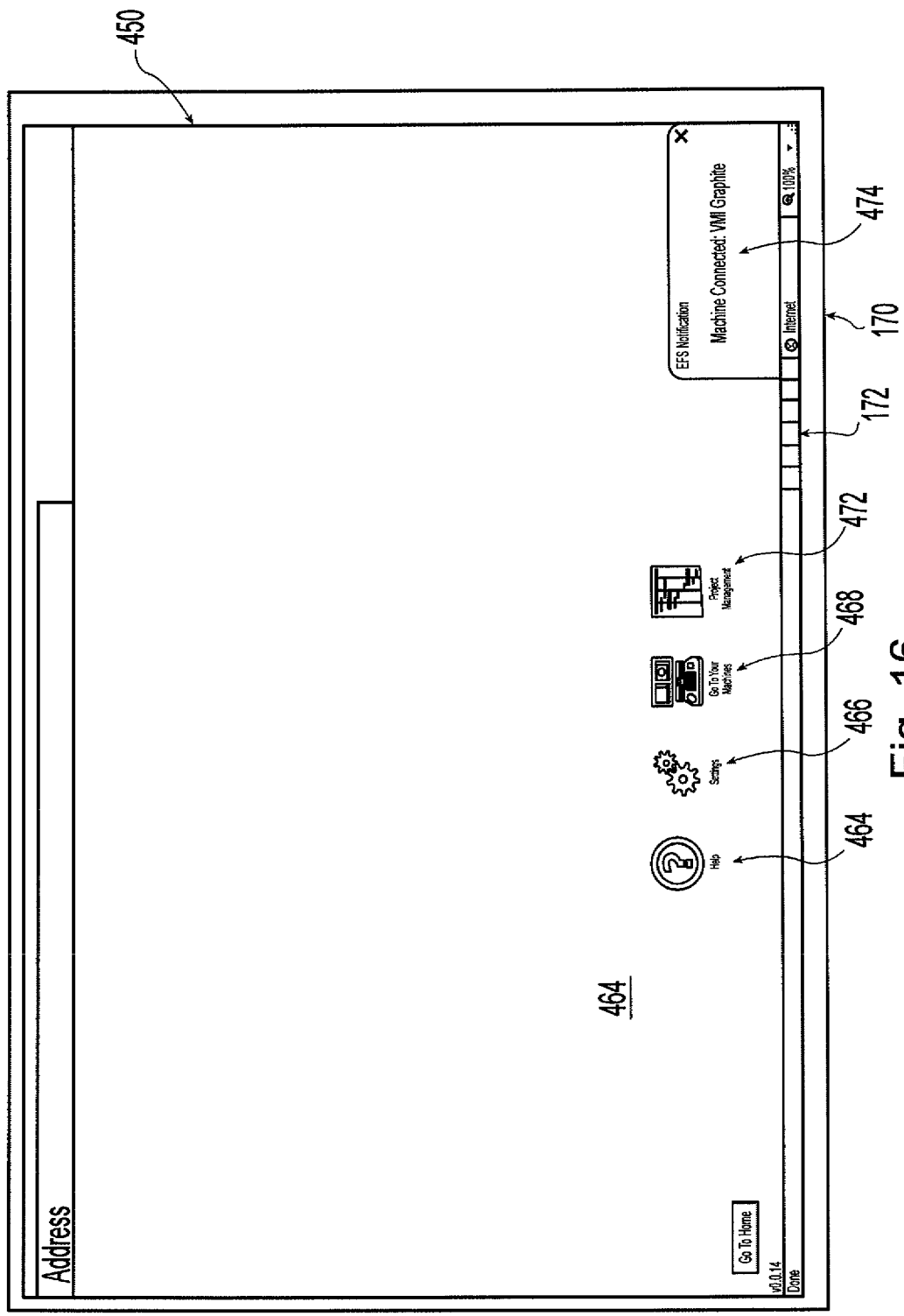
FIG. 16 is a representative view of the main screen of FIG. 15 illustrating a visual cue of a change in status of a machine tool system presented through the user interface presented to a user by the user system of FIG. 1.

Referring to FIG. 15, once the user is authenticated a home webpage 462 is presented. Home webpage 462 includes plurality of links to other features of user interface 450. A help link 464 launches various help files related to aspects to machine tool system 106 and/or user interface 450. A settings link 466 provides the user with access to customize their viewing experience. Exemplary modifications include colors, screen size, font type, layout, and personal information. A go to your machines link 468 is selected to take the user to a machine home page 470 which is shown in FIG. 17.

A project management link 472 is selected to take a user to a project management webpage wherein information regarding various active and/or inactive queued jobs for the machine tool systems 106 are presented. In one embodiment, jobs may be queued for a given machine tool system through the project management link 472. In one embodiment, a user of user interface 450 (described herein) is able to push part programs 274 to specified machine tool systems for execution. In addition, the user may specify additional data related to the part program 274. Exemplary additional data includes a timeframe for executing the part program, such as next week, a type of metal blank to cut the part out of, and other parameters, such as the total quantity of parts to make. The additional data may be sent to an output member of the machine tool system by either a notification or entry in an event log of upcoming jobs which is viewable at the machine tool system by an operator.

Referring to FIG. 16 webpage 462 is again shown along with a pop up notification 474 in the lower right corner. Notification 474 is notifying the user of user interface 450 that a particular machine tool system named "VM1GRAPHITE" has been connected to remote controller 296. As such, current information regarding this machine tool system is now available to this user of user interface 450.

Figure 17:
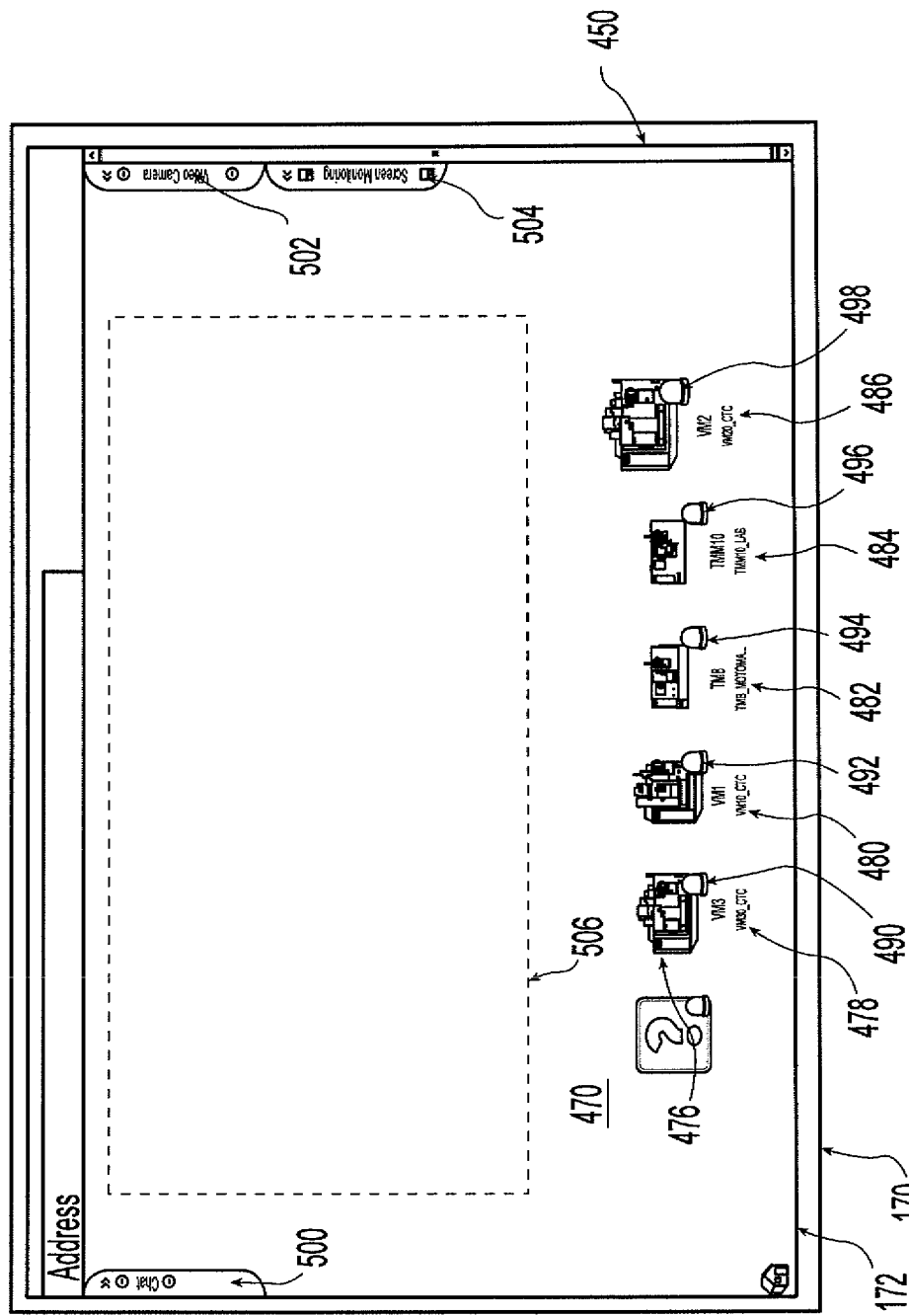

Referring to FIG. 17 machine homepage 470 is shown. Provided on page 470 is a listing 476 of the machine tools that the user of user interface 450 is permitted to review. The listing 476 provides a graphical representation of each machine tool system. As shown in FIG. 17, graphical representations 478-486 are provided for five respective machine tool systems.

Each of graphical representations 478-486 includes a visual indication 490-498, respectively, to indicate whether the corresponding machine tool system is currently connected with remote controller 396 or not. In one embodiment, a green ball indicates that the respective machine tool system is connected to remote controller 296 while a red ball indicates that the respective machine tool system is not connected to remote controller 296. If a machine tool system is not connected to remote controller 296, the user of user interface 450 is more limited in their ability to perform tasks through user interface 450. The graphical representation 486 is larger than the remaining graphical representation 478-484. This indicates that the machine tool system corresponding to graphical representation 486 is currently the selected machine tool for which information will be provided through user interface 450. A user of user interface 450 may select one or more of the other machine tools by selecting their corresponding graphical representation.

As shown in FIG. 17, a chat component 500, a video camera component 502 and a screen monitoring component 504 of web page 470 are provided. As shown in FIG. 17, each of chat component 500, video camera component 502 and screen monitoring component 504 are shown in a collapsed configuration. This permits a presentation area 506 of user interface 450 to be larger in size.

Figure 18:
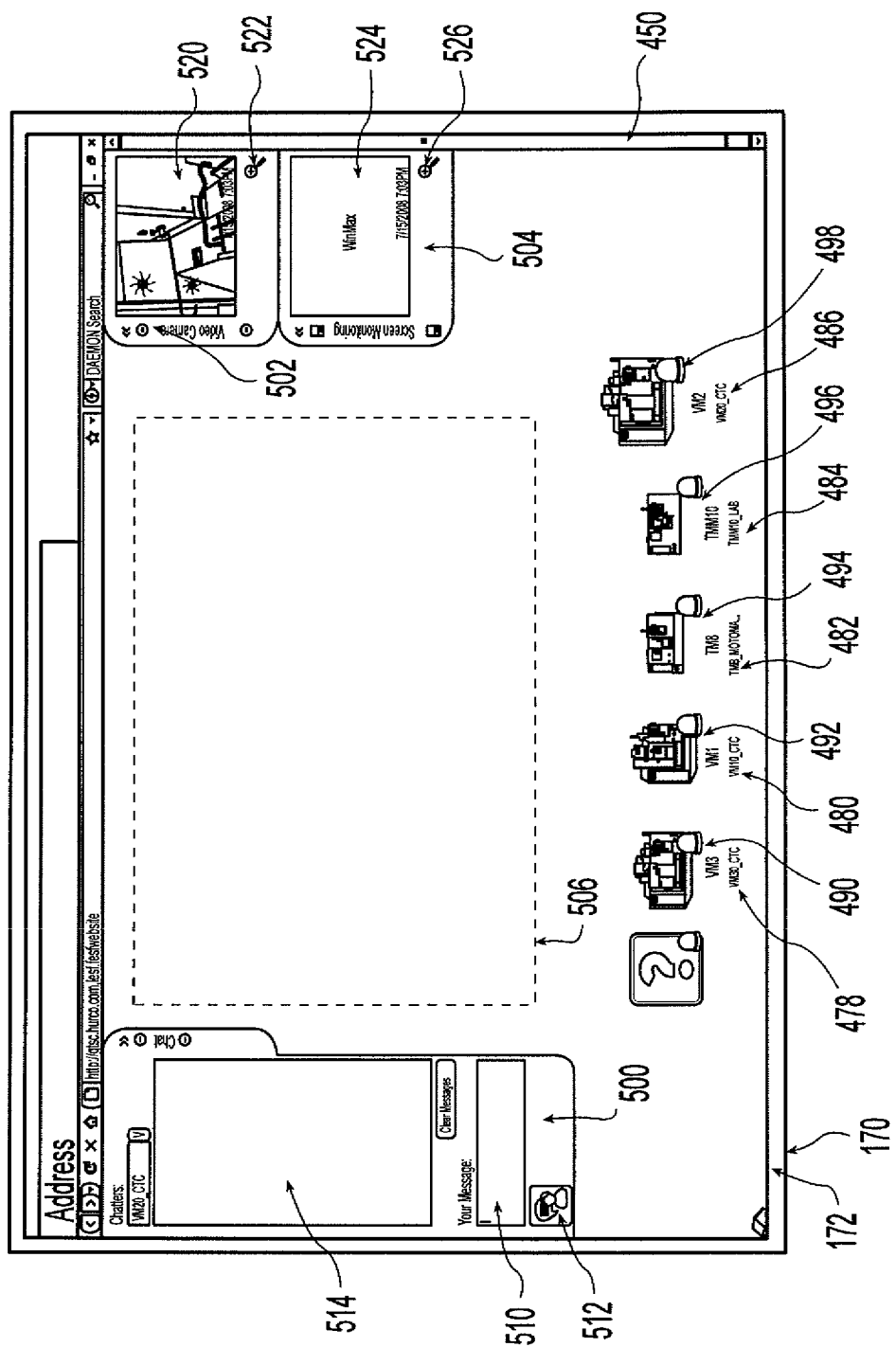
FIG. 18 is a representative view of the main machine screen of FIG. 17 illustrating a chat interface, a video interface, and a screen monitoring interface shown in an expanded state and a presentation region.

Referring to FIG. 18, chat component 500, video camera component 502 and screen monitoring component 504 are shown in an expanded configuration. In this expanded configuration, the presentation area 506 of user interface 450 is reduced.

Chat component 500 permits a user of user interface 450 to enter a message in input box 510 and to send the entered message to an operator of the machine tool system corresponding to graphical representation 486 by selecting input 512. The sent message will then be displayed on one of display screen 278 and 279 of the respective machine tool system or otherwise communicated via an output member 277 of the machine tool system. At the machine tool system, an operator is able to provide a response through inputs generally the same as inputs 510 and 512 of user interface 450. Responses from the operator are presented to a user of user interface 450 in region 514. In one embodiment, a user of user interface 450 must initiate the chat session to the machine tool system. In one embodiment, machine tool software includes a chat component which permits an operator of the machine tool system to initiate a chat session with a remote party. In one example, the machine tool software permits the machine tool operator to initiate a chat session with a representative of the machine tool manufacturer, service, and/or warranty provider.

Figure 19:
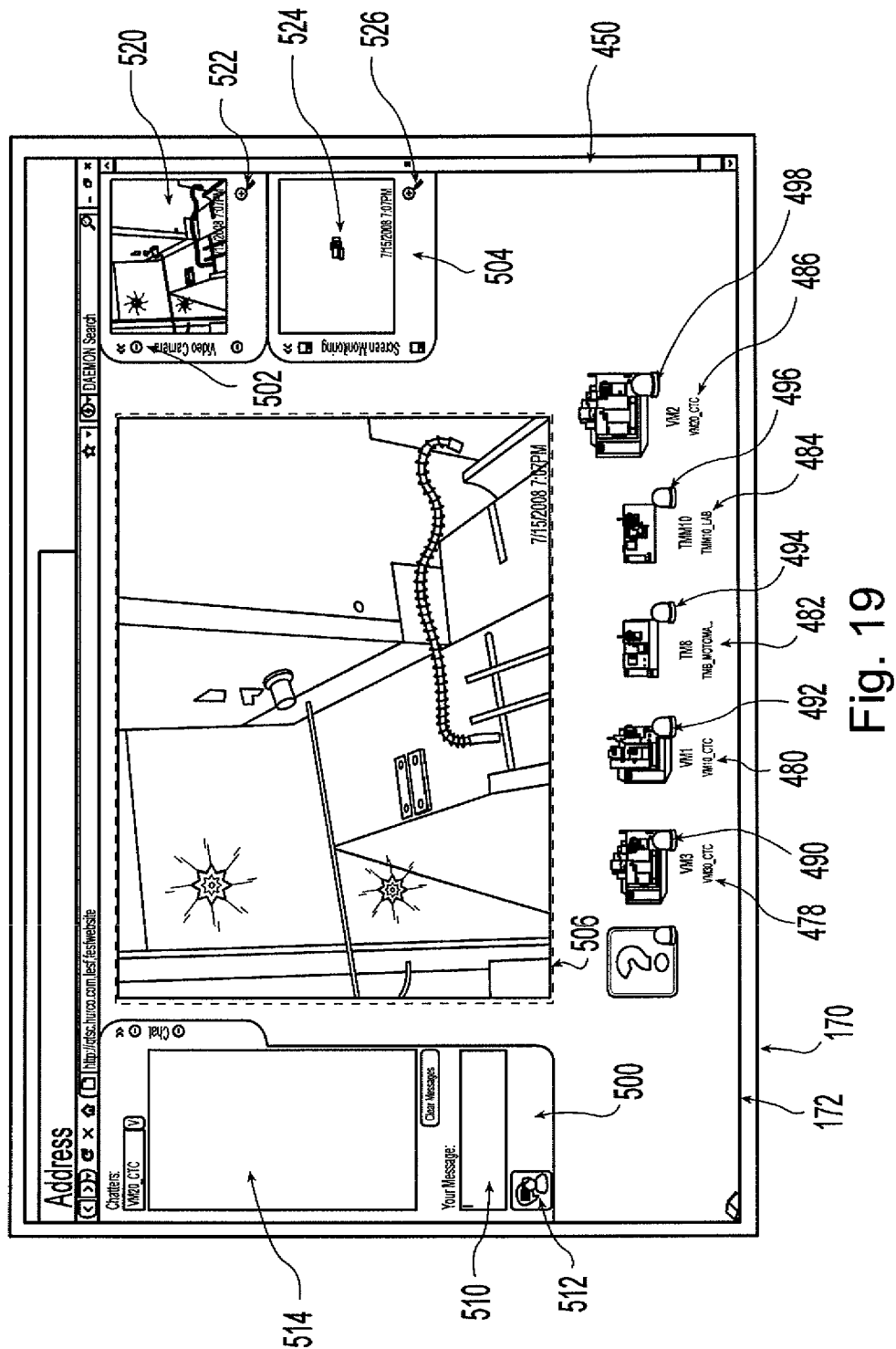
FIG. 19 is a representative view of FIG. 18 having the video image of the video interface enlarged and presented in the presentation region.

Video camera component 502 shows the most recent image received for a video camera 384 associated with the machine tool system corresponding to graphical representation 486. If the machine tool system had multiple cameras, the operator of user interface 450 would have the ability to select which camera from which to view images. As represented in FIG. 19, the image 520 may be expanded and presented in presentation area of 506 by selecting input 522. In one embodiment, video camera 384 is able to stream live video to be shown with video camera component 502. In one embodiment, video camera 384 sends still images which are captured by video camera 384.

Screen monitoring component 504 presents the most recent screen shot of the display of the machine tool system corresponding to graphical representation 486. If the machine tool includes multiple displays, such as displays 278 and 279, then the user of user interface 450 would be able to select of which screen to view screenshots. A screenshot 524 may be presented in the presentation area 506 by selecting input 526.

Figure 20:
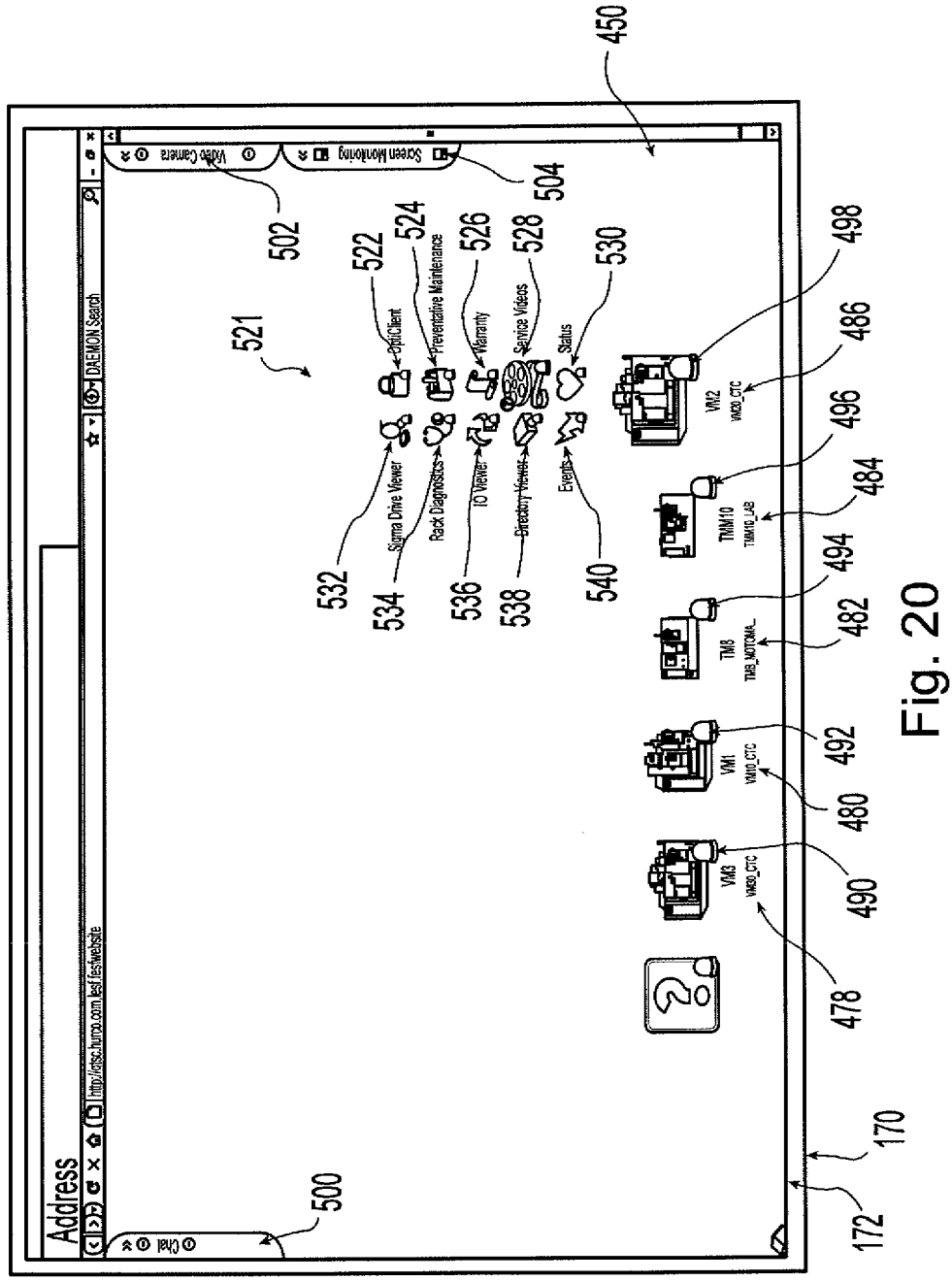
FIG. 20 is a representative view of the main machine screen of FIG. 17 illustrating a plurality of selectable options related to a selected machine tool system.

Referring to FIG. 20, when a user of user interface 450 selects graphical representation 486 a plurality of icons 521 are displayed generally about graphical representation 486. Illustratively, a first icon 522 is shown along with textual label "OptiClient." A second icon 524 is shown along with a textual label "Preventative Maintenance." A third icon 526 is shown along with a textual label "Warranty." A fourth icon 528 is shown along with a textual label "Service Videos." A fifth icon 530 is shown along with a textual label "Status." A sixth icon 532 is shown along with a textual label "Sigma Drive Viewer." A seventh icon 534 is shown along with a textual label "Rack Diagnostics." An eighth icon 536 is shown along with a textual label "IO Viewer." A ninth icon 538 is shown along with a textual label "Directory Viewer." A tenth icon 540 is shown along with a textual label "Events."

In one embodiment, an eleventh icon is also provided along with a textual label "Templates." By selecting this icon, a user is presented with options to control the display characteristics of the given machine tool system. For instance, the user could specify color scheme, font size, font type, font color, backgrounds, resolution, language of text, and additional features. As such, the appearance of the display of the machine tool system may be customized for each customer. In one embodiment, the selected display characteristics are included in the files to be synced to the machine tool systems. Therefore, a user may update the appearance of all of the connected machine tool systems being by the customer.

Returning to FIG. 20, as stated herein a color of ball 498 provides indication whether the machine tool system corresponding to graphical representation 486 is currently connected to remote controller 296 or not. Assuming that the machine tool system corresponding to graphical representation 486 is connected to remote controller 296, each of icons 522-540 are selectable by a user of user interface 450. To visually illustrate this connection status, the textual labels of each of icons 522-540 are shown in green. In contrast, if the machine tool system corresponding to graphical representation 486 was not connected to remote controller 296 several of the textual labels of icons 522-540 would be shown in red indicating that they are not currently selectable by a user of user interface 450. In one embodiment only graphical icons 528, 534, and 540 are selectable by user of user interface 450 when the machine tool system corresponding to graphical representation 486 is not connected to a remote controller 296.

Figure 21:
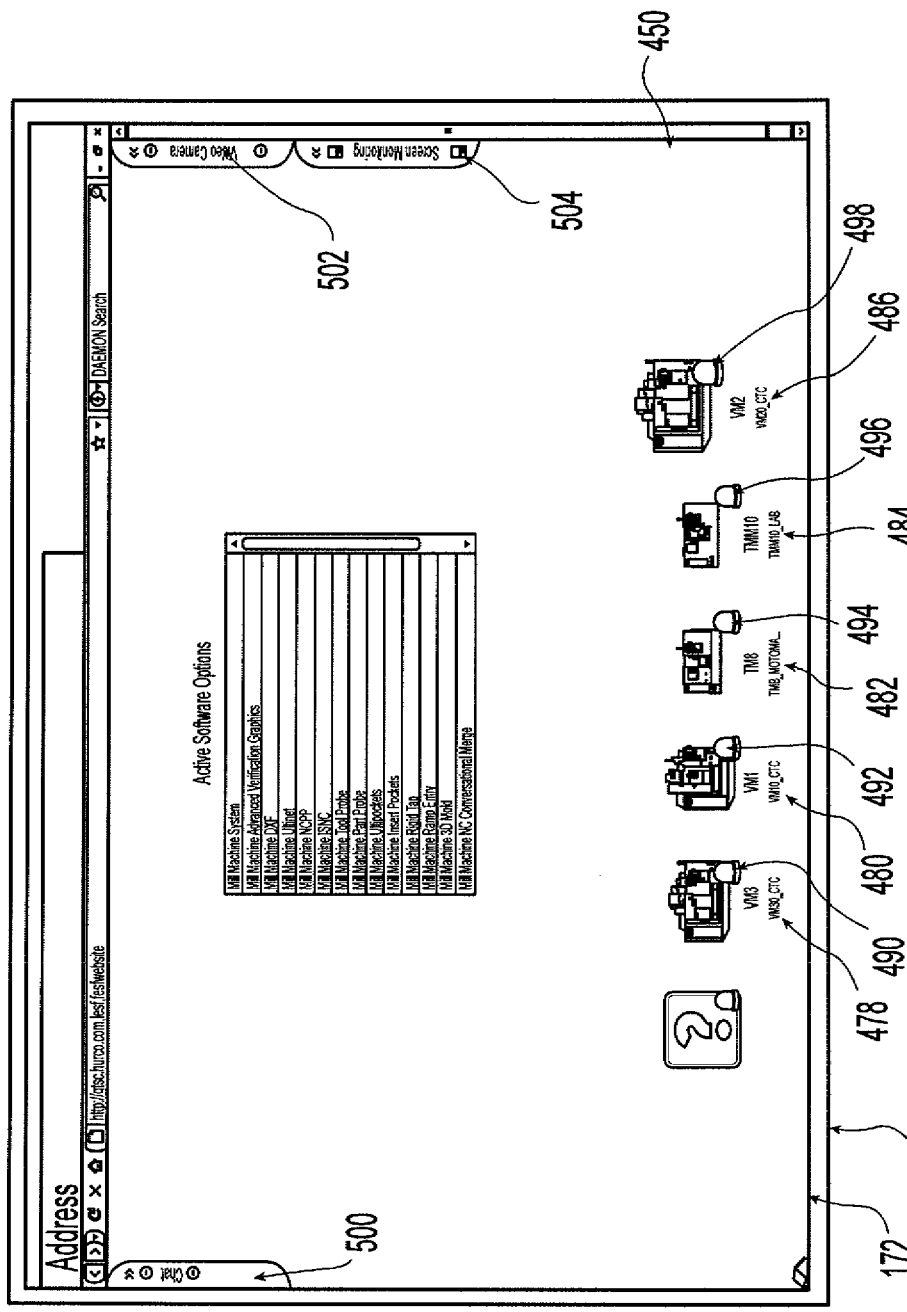
FIG. 21 is a representative view of a screen presented in response to the selection of an active software option of the plurality of selectable options related to a selected machine tool system.

A selection of graphical icon 522 presents a listing of active software options in presentation area 506 as shown in FIG. 21. These active software options provide an indication to the user of the options which have been activated for the machine tool system corresponding to graphical representation 486. An exemplary system for activating the machine tool options is disclosed in U.S. patent application Ser. No. 12/103,680, filed Apr. 15, 2008 titled SOFTWARE OPTIONS SELECTION AND VALIDATION SYSTEM, the disclosure of which was expressly incorporated by reference herein.

Graphical icon 524 provides a listing of parameter values that are relevant to preventative maintenance for the machine tool system associated with graphical representation 486. Exemplary parameters include air pressure, readings of readings of non-digital components of the machine tool system (via external sensors components), and fluid levels of the coolant system or spindle lube levels of the machine tool system. These parameters and their values are presented in the presentation area of 506. In one embodiment alerts are provided in presentation area 506 to alert the user of user interface 450 of items related to the preventative maintenance. In one example, the user of user interface 450 may request to be notified of parameter values which are outside of an acceptable range. For instance, a temperature that is too high or a fluid level that is too low. This may be accomplished by including preventative maintenance parameters to the listing of input 600 in FIG. 29 and selecting the corresponding notification delivery with input 602.

Graphical icon 526 relates to warranty information for the machine tool system associated with graphical representation 486. In one embodiment alerts are provided in presentation area 506 to alert the user of user interface 450 of items related to the warranty. In one example, the user is presented with information that the tool spindle has been running for approximately one hundred hours and requires lubing under the provisions of the warranty for the machine tool system associated with graphical representation 486. Remote controller 296 compares the collected information received from the machine tool system with the provisions of the warranty to determine if an alert condition exists. In the case of a tool spindle, remote controller 296 compares the collected running time of the tool spindle to a suggested running time of the spindle without lubing the tool spindle. If the collected running time of the tool spindle is approaching the suggested running time or has exceeded the suggested running time an alert condition is set and an alert notification should be sent. In one example an alert notification is sent when the running time of the tool spindle is within about ten percent of the suggested running time of the spindle. In one embodiment, an alert notification is sent to a user responsible for preventative maintenance of the machine tool system and/or a user responsible for warranty compliance, if not the same user, to provide an indication of the alert. In one embodiment, the user of user interface 450 may request to be notified of warranty alert conditions. This may be accomplished by including preventative maintenance parameters to the listing of input 600 in FIG. 29 and selecting the corresponding notification delivery with input 602.

Figure 22:
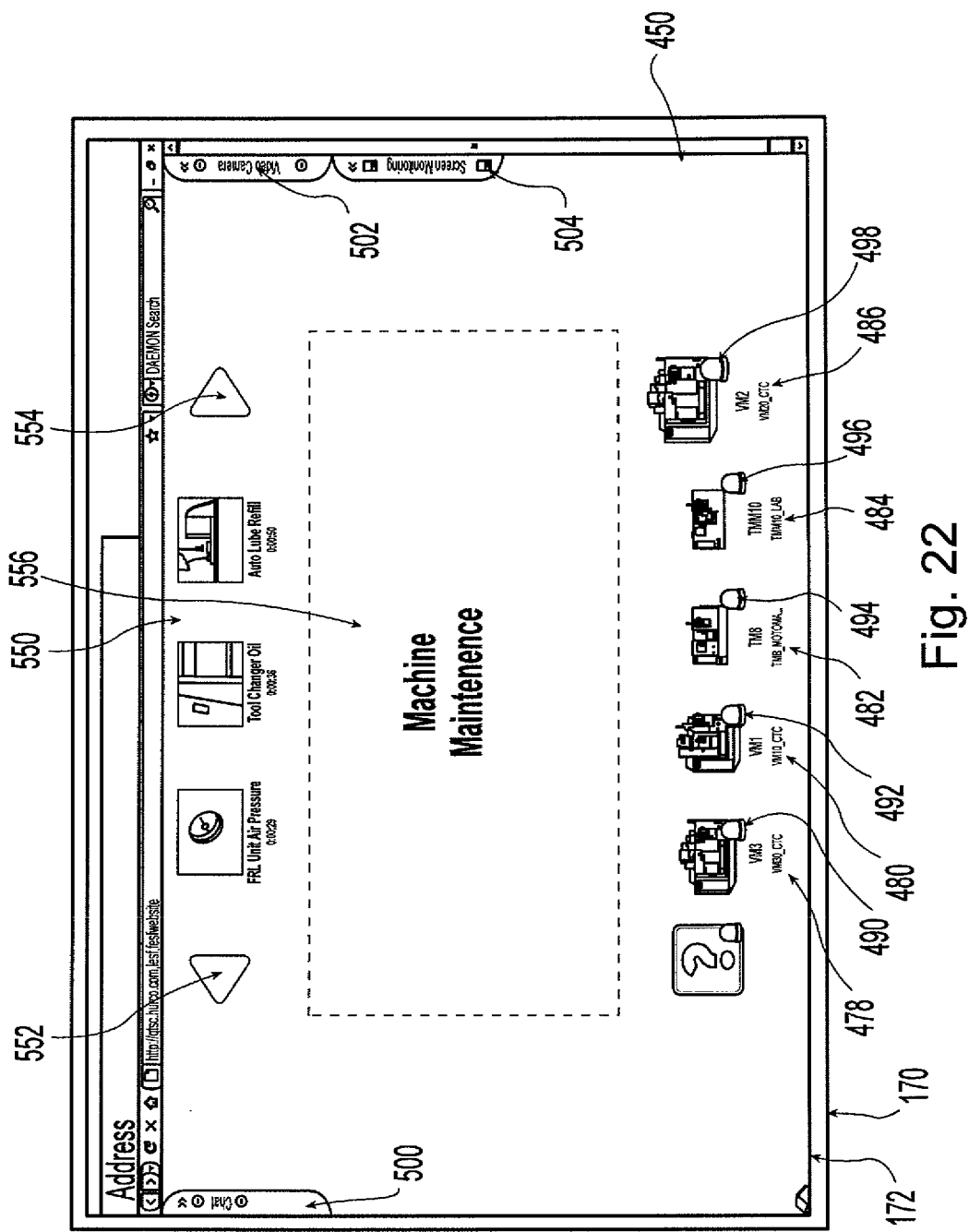
FIG. 22 is a representative view of a screen presented in response to the selection of a service video software option of the plurality of selectable options related to a selected machine tool system.

A selection of graphical representation 528, results in the presentation of service videos in the presentation area 506 of user interface 450. Referring to FIG. 22, thumbnail views of various service videos are presented in a first region 550 of presentation area 506. Additional thumbnail views of service videos may be shown through the selection of one of scrolling inputs 552 and 554. A selected service video will be shown in region 556 of presentation area of 506.

Figure 23:
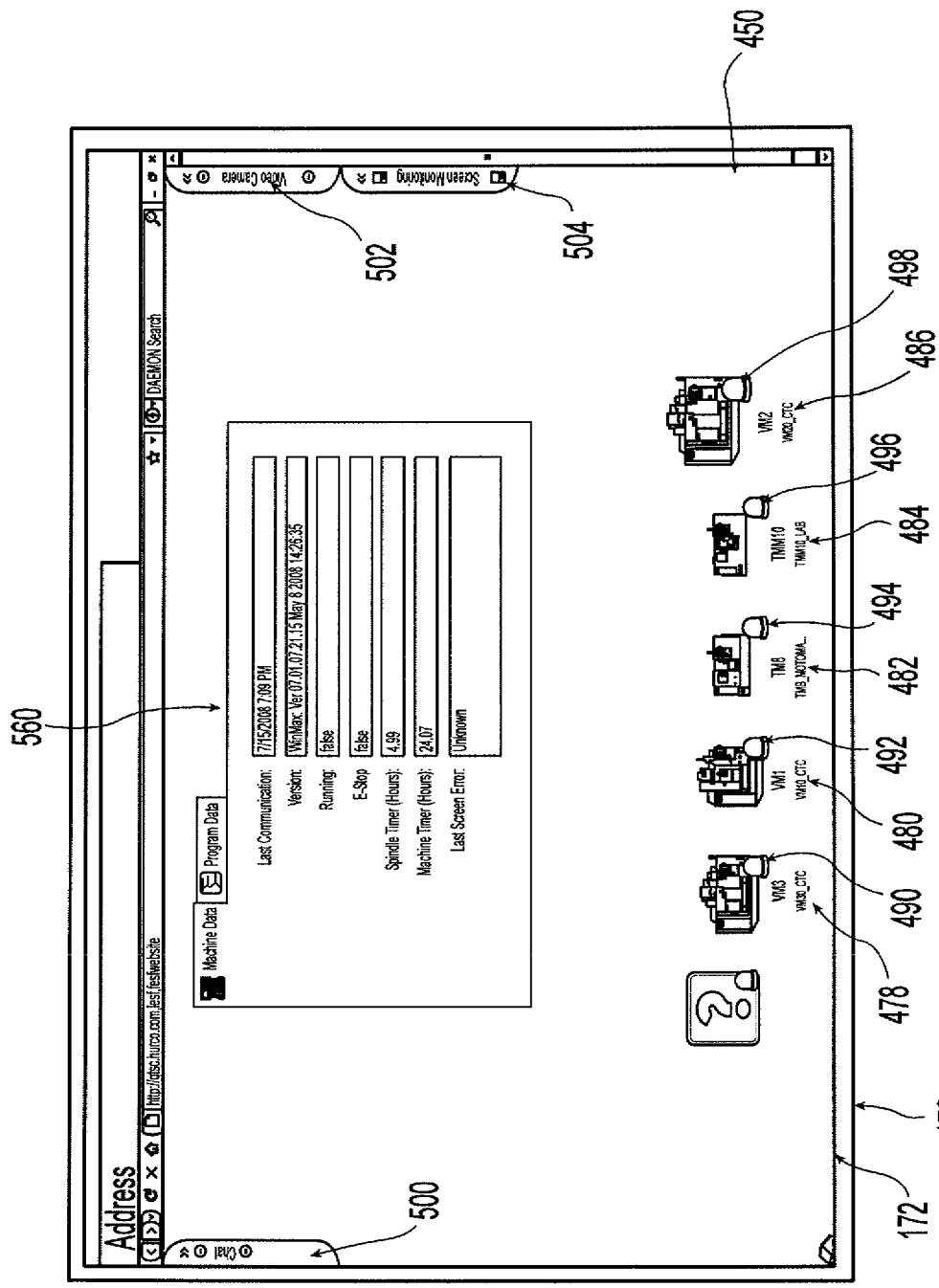
FIG. 23 is a representative view of a screen presented in response to the selection of a status software option of the plurality of selectable options related to a selected machine tool system illustrating machine data of the machine tool system.
Figure 24:
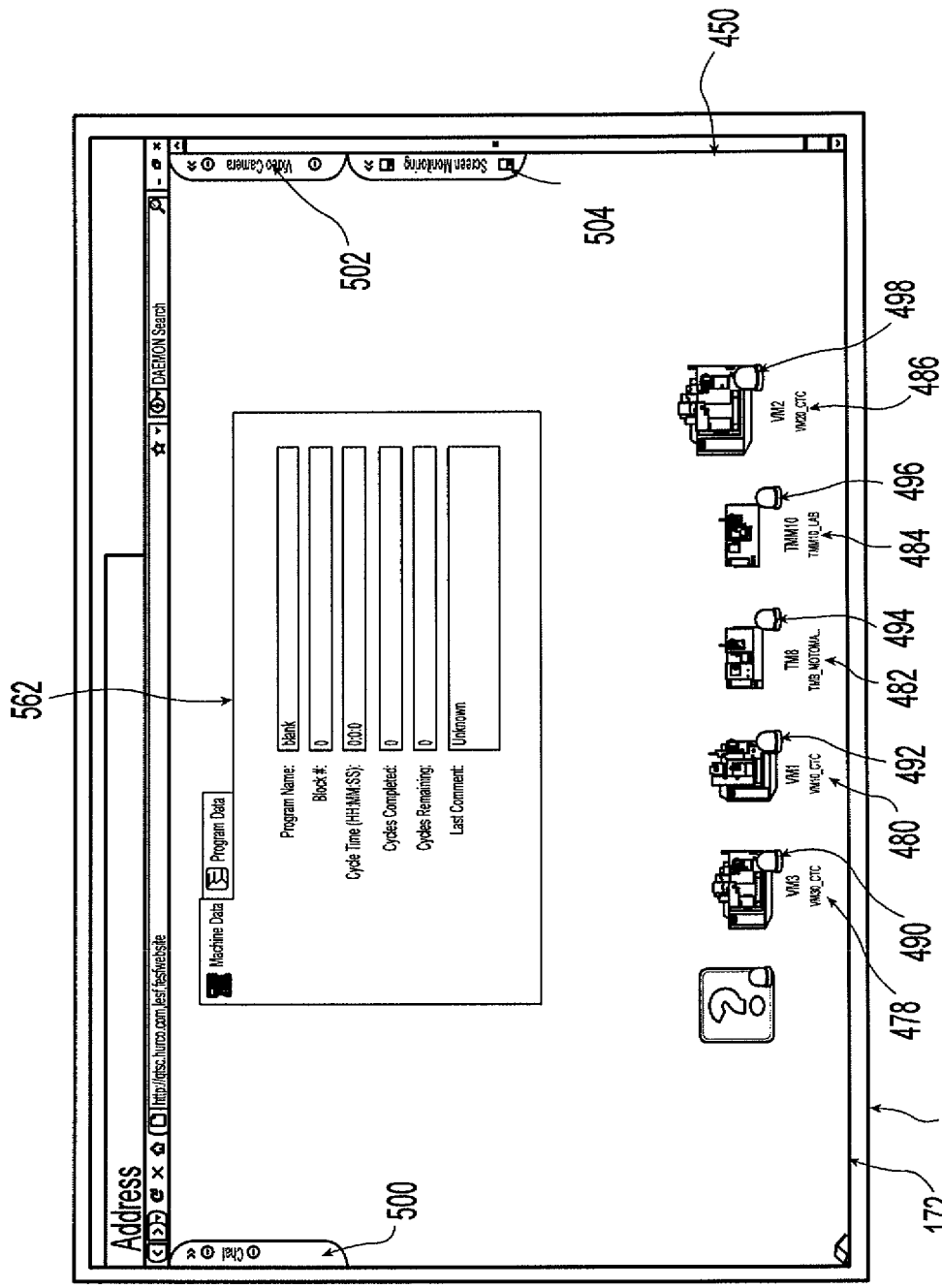
FIG. 24 is a representative view of a screen presented in response to the selection of a status software option of the plurality of selectable options related to a selected machine tool system illustrating program data of the machine tool system.

The selection of graphical icon 530 presents status information in presentation area 506. Referring to FIG. 23, a first set of status information 560 is shown in presentation area 506. This status information provides the last time the machine tools system has communicated with remote controller 296, the version of motion control software which is provided on the machine tool system, whether the machine tool system is currently executing a part program or not, whether an emergency stop associated with the machine tool system has been activated, the spindle timer in hours, the machine timer in hours, and the last screen error to provide an error code for a technician reviewing the status information 560. A second grouping of status information 562 is shown in FIG. 24. This status information provides information regarding the part program 274 currently being executed by the machine tool system. Status information includes a program name, the current block that the program is on (if the part program is written in conversational programming language), the current cycle time or run time for the part program, the number of cycles completed if the machining program includes multiple instances of a part to the machine, the number of cycles remaining, and the last comment. The last comment provides the last on screen error or response message that the user would have seen with output member 277 and possibly would have had to respond to through input members 276.

Figure 25:
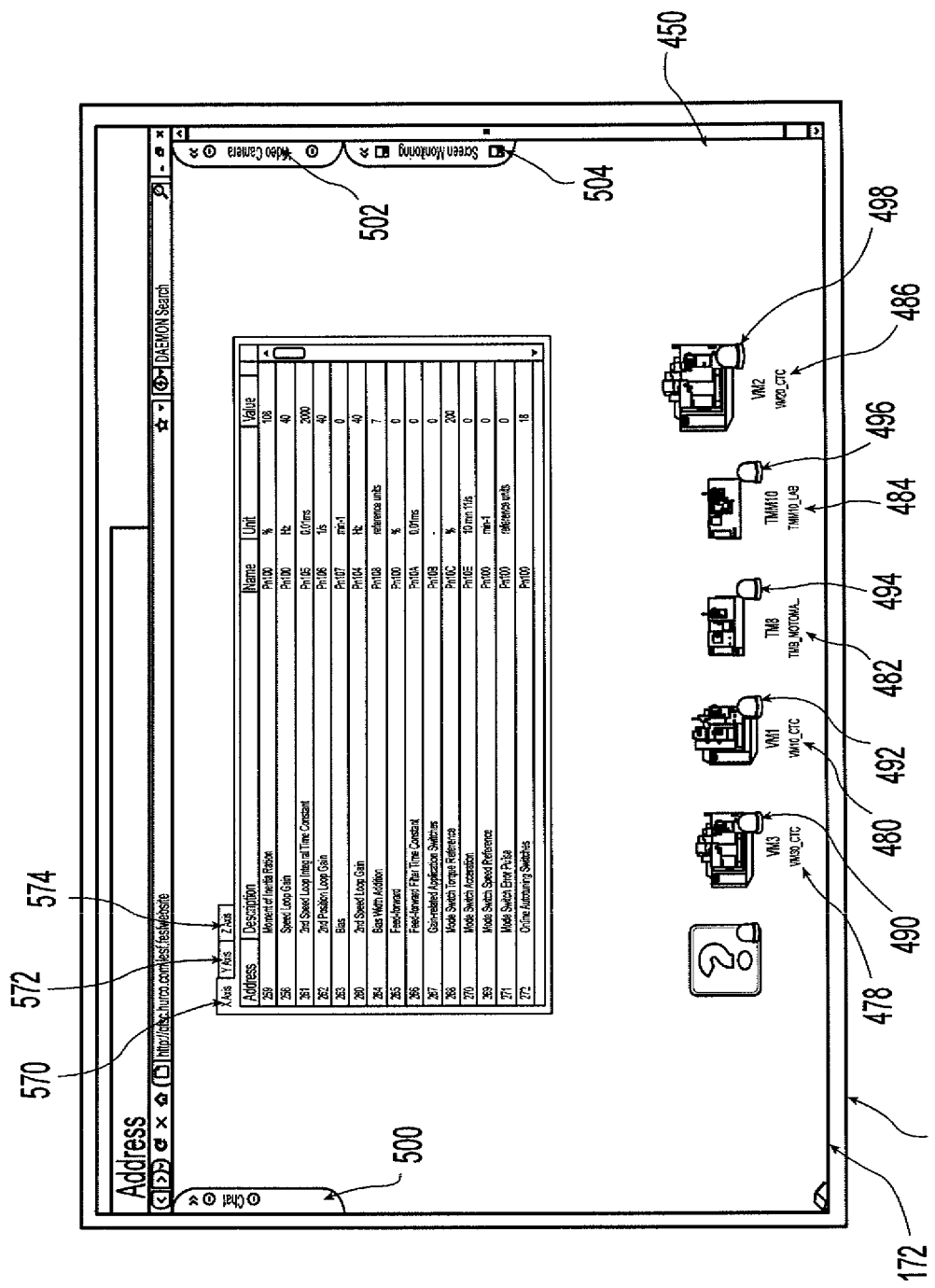
FIG. 25 is a representative view of a screen presented in response to the selection of a drive viewer option of the plurality of selectable options related to a selected machine tool system including a plurality of selectable axis.

By selecting graphical icon 532, parameters values for each of the respective axis controllers of the machine tool system are shown. Referring to FIG. 25, the machine tool system associated with graphical representation 486 is a three axis machine including an x-axis, a y-axis, and a z-axis. A user of user interface 450 may select to see the parameters of the x-axis by selecting input 570, to see the parameters of the y-axis by selecting input 572, and to see the parameters of the z-axis by selecting input 574. The parameter values are presented in presentation area 506. In one embodiment, a user of user system 160 is only able to view the parameter values. Changing the parameter values is accomplished at the machine tool system. In one embodiment, a user of user system 160 is able to change a value of one of the parameters resulting in the corresponding change being made on the machine tool system.

Figure 26:
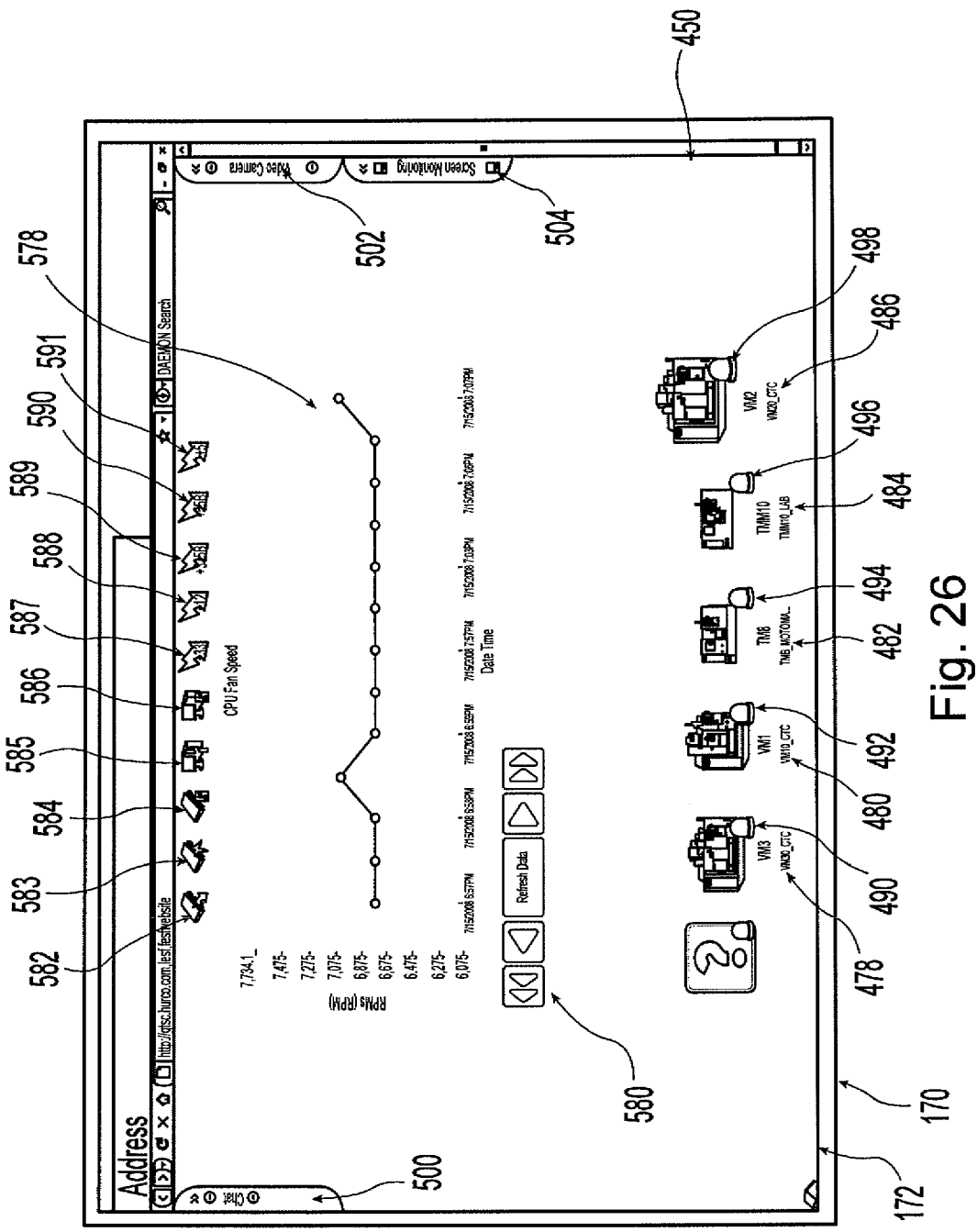
FIG. 26 is a representative view of a screen presented in response to the selection of a rack diagnostics software option of the plurality of selectable options related to a selected machine tool system.

By selecting graphical icon 534, diagnostic information regarding the machine tool system is provided. In one embodiment, the diagnostic information provides a historical trend. Referring to FIG. 26, a graph 578 of the CPU fan speed of machine tool controller 202 is shown as a function of time in presentation area 506. Controls 580 may be used by a user of user interface 450 to adjust the graph 578. The left most control results in graph 578 starting at the beginning of the stored data in memory 294 while the penultimate left control simply increments the graph back into time at discrete intervals. The middle control refresh and updates the graph 578 with any subsequently received values. The penultimate right control increments the graph 578 forward into time at discrete intervals while the right most control results in graph 578 showing the end of the stored data in memory 294.

Additional diagnostic information may be graphed by selecting from the plurality of inputs across the top portion of presentation area 506. Icon 582 corresponds to core voltage of the CPU. Icon 583 corresponds to CPU fan speed. Icon 584 corresponds to CPU temperature. Icon 585 corresponds to system fan speed which cools an interior of the cabinet. Icon 586 corresponds to system temperature. Icon 587 corresponds to +3.3 volts supply on the board of the CPU. Icon 588 corresponds to +12 volts of supply on the board of the CPU. Icon 589 corresponds to +3.3 stand by Volts of supply on the board of the CPU. Icon 590 corresponds to +5 stand by Volts of supply on the board of the CPU. Icon 591 corresponds to +5 Volts of supply on the board of the CPU. In one embodiment, external sensors may be coupled to machine tool system to monitor the parameters, such as temperature, of the environment around the machine tool system.

Figure 27:
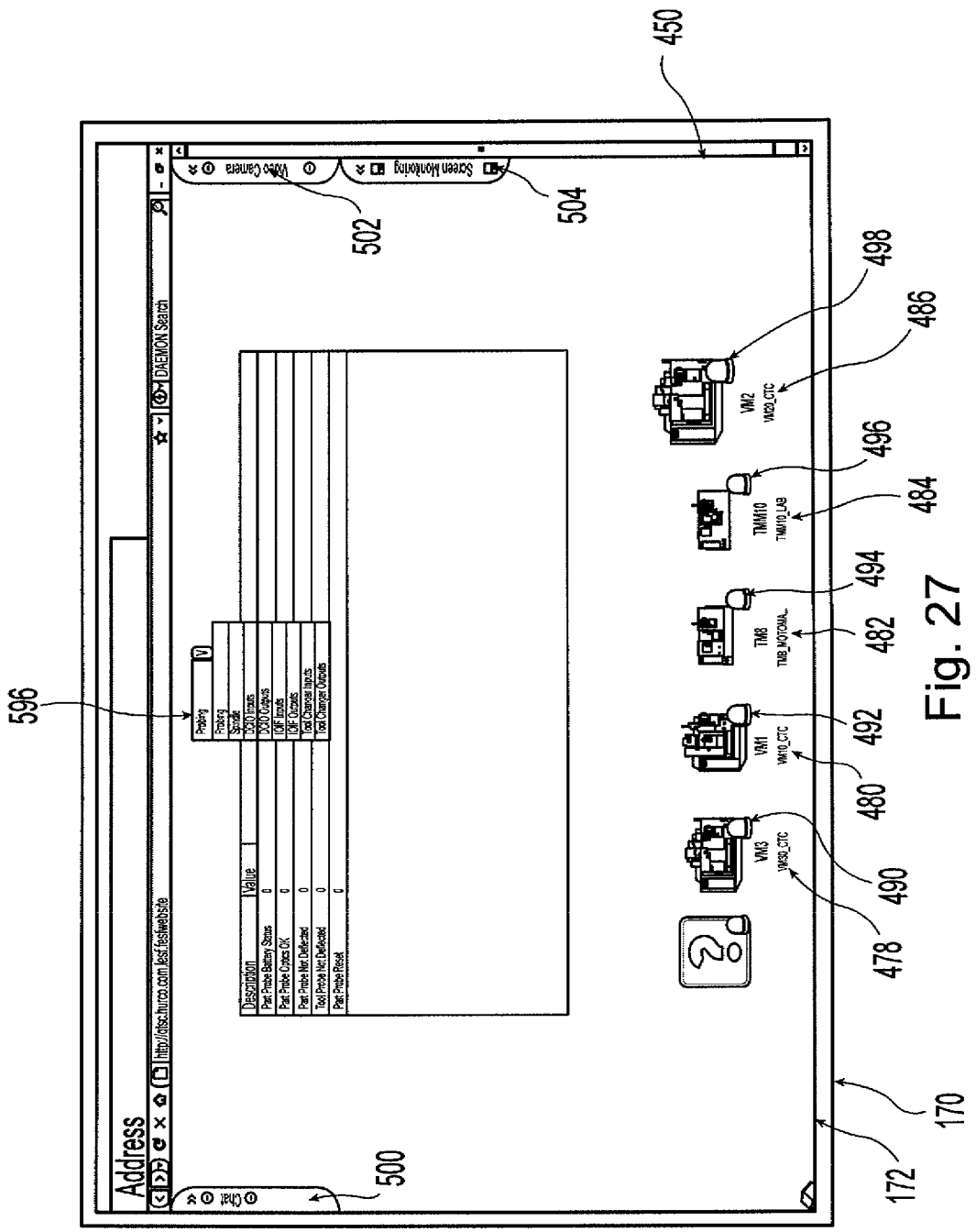
FIG. 27 is a representative view of a screen presented in response to the selection of an I/O viewer software option of the plurality of selectable options related to a selected machine tool system.

By selecting graphical icon 536, hardware information about the machine tool system associated with graphical representation 486 is presented in presentation area 506. Referring to FIG. 27, a user of user interface 450 may select various hardware components with input 596 resulting in information regarding the selected hardware components being presented in presentation area 506. Exemplary hardware information includes probing information, spindle information (such as tool spindle speed), DC Power Input Output (DCIO) information, Input Output Interface (IOIF) information, and tool changer or carousel information.

Figure 28:
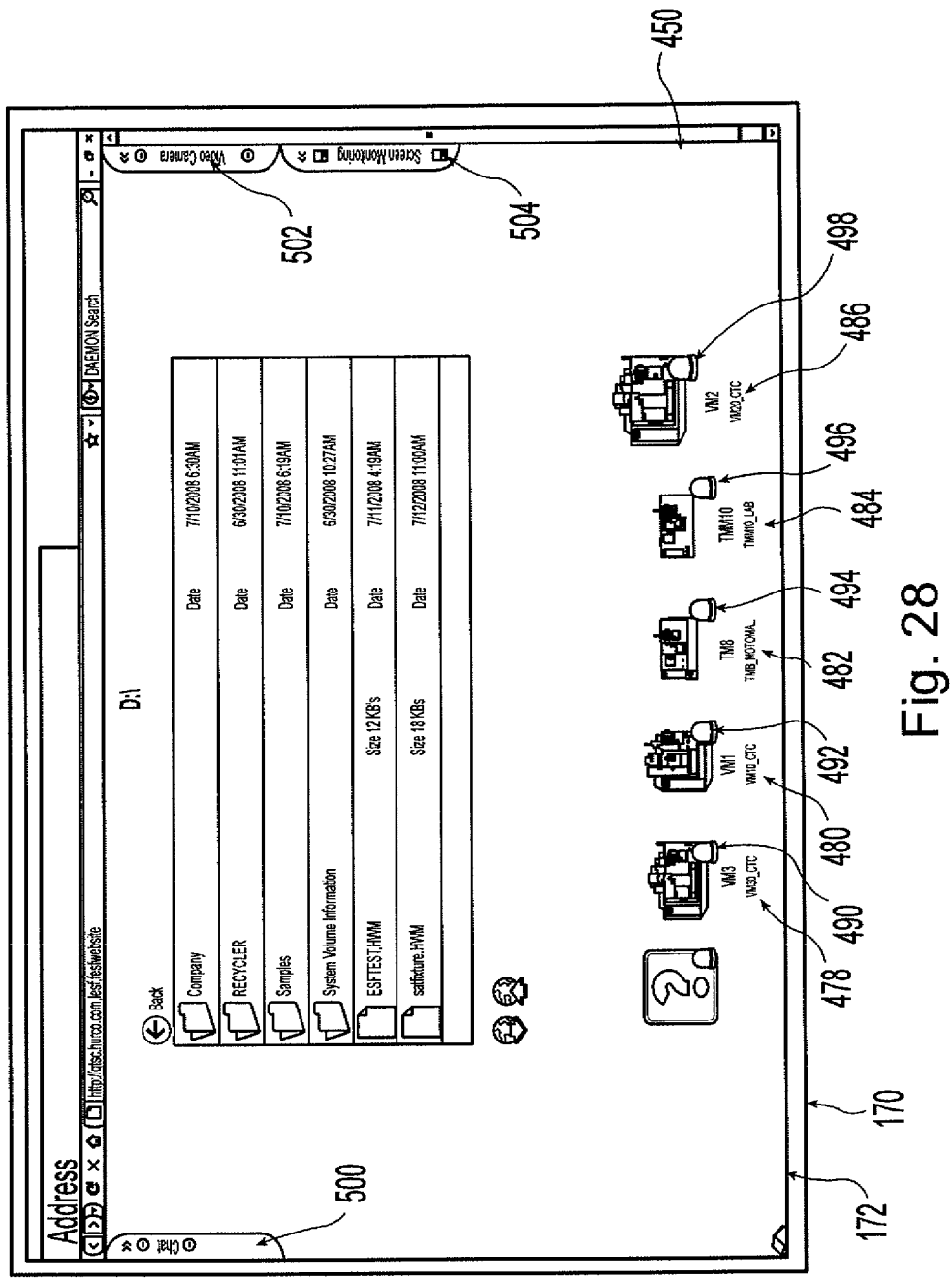
FIG. 28 is a representative view of a screen presented in response to the selection of a directory viewer software option of the plurality of selectable options related to a selected machine tool system.

By selecting graphical icon 538, a directory and file listing of memory 270 is presented in presentation area 506 as shown in FIG. 28. A user of user interface 450 is able to browse through the directory and file structure in a similar fashion to the WINDOWS brand family of software available from Microsoft Corporation. A user may delete files from memory 270 or upload files to memory 270. In one embodiment, a user will only be able to delete files that they have rights to delete. For example, a user may delete their own part files. A machine tool manufacturer representative may delete files associated with software 271. In one embodiment, a user may retrieve files from memory 270 to view their contents.

Figure 29:
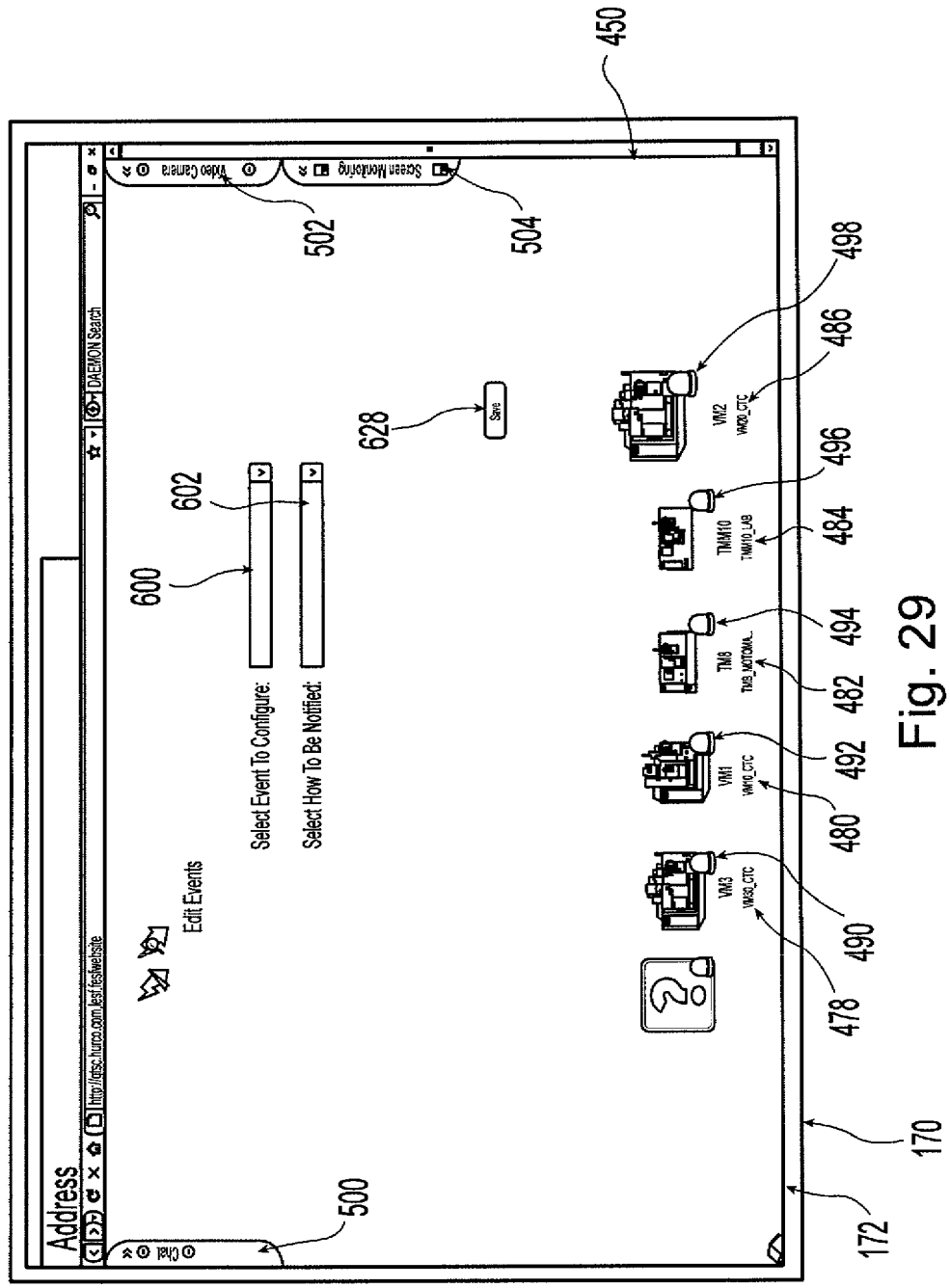
FIG. 29 is a representative view of a screen presented in response to the selection of an event software option of the plurality of selectable options related to a selected machine tool system whereby a user may select an event and select a notification method for that event.

By selecting graphical icon 540, an edit event input is displayed in presentation area 506, as shown in FIG. 29. A first input 600 provides a plurality of events for the user of the user system to select. A second input 602 provides a plurality of methods by which the user of the user system should be notified of the occurrence of the event selected with input 600. The events correspond to a condition of the machine tool system and are tied to the user whom selected to be notified thereof. In one embodiment, events may be set for a group of users. In one embodiment, a notification of a given event may be automatically sent to a given user based on that user's responsibilities. For instance, a service technician may automatically receive notifications of all preventative maintenance reminders and parameters out of range, such as fluid levels. As another example, a machine tool operator may automatically receive a notification that the part program 274 being executed failed. In one embodiment, the determination of whether the part program 274 being executed failed or not is made by the process of monitoring for an error code issued by the motion control software. The issuance of an error code will be in response to a failure of the part program. In one embodiment, the determination of whether the part program 274 being executed failed or not is made by the process of monitoring a time of the current cycle of the program and comparing that to an estimated cycle time of the program and determining that the part program 274 failed when the current cycle time exceeds the estimated cycle time.

In one embodiment, the user may select a notification method that sends a notification to a user device other than the user device being used to access user interface 450. In one example, a user interacts with user interface 450 through their office computer and requests notifications sent to their cell phone as a text message because they are going to be out of the office that day.

Figure 31:
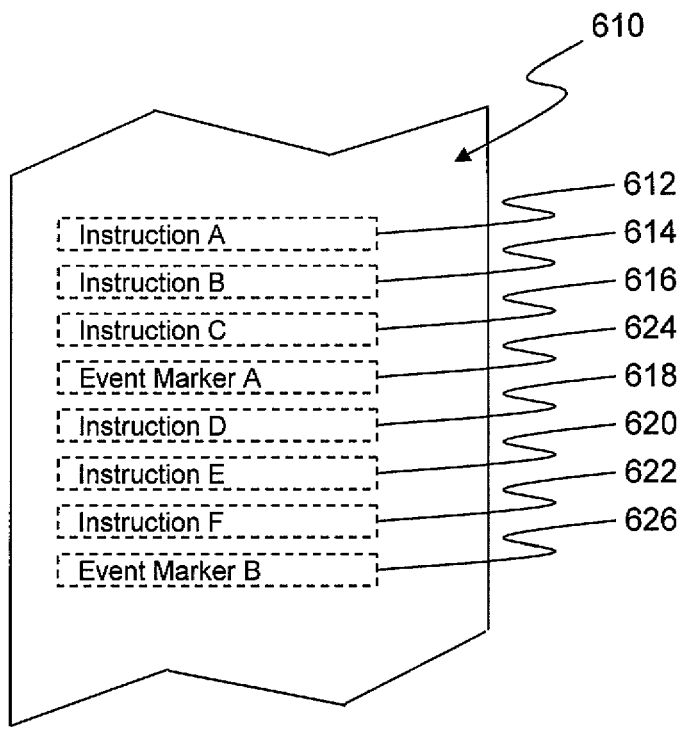
FIG. 31 is a representative view of a portion of a part program including a plurality of event markers.

In one embodiment, the events selectable through input 600 correspond to event markers included in a part program. Referring to FIG. 31, a portion of an exemplary part program 610 is shown. Part program 610 includes a plurality of instructions 612, 614, 616, 618, 620, and 622 and two event markers, illustratively event marker A 624 and event marker B 626. Each of instructions 612, 614, 616, 618, 620, and 622 may correspond to providing instructions regarding the tool to use for the next operation or may correspond to the a path for the tool to follow. In one embodiment, event marker A 624 and event marker B 626 are specific M codes. In one embodiment, four event markers are provided, M codes M1, M2, M3, and M4. These markers may be placed in part program 610 to provide any indication of a completion of one of instructions 612, 614, 616, 618, 620, and 622. The M codes are simply one type of event marker.

A customer may utilize the M codes as desired. For instance, M1 may always be used to indicate the end of part program 610 while M2 may always be used to indicate the end of a cycle of part program 610. In one embodiment, the M codes may be used in a random manner.

Returning to FIG. 29, a user selects one of M codes M1, M2, M3, and M4 from input 600. With input 602 the user selects a notification method for the event selected with input 600. The user may then save the event by selecting input 628. By selecting input 628, remote controller 296 stores in database 298 the event to be monitored for and the requested notification method. Remote controller 296 also notifies machine tool controller 202 to add the event to a listing of the parameters to watch. In one embodiment, machine tool controller 202 always reports the occurrence of one of the M codes M1, M2, M3, and M4 and remote controller 296 then only provides a notification to those users which selected to be notified about the respective M code.

Figure 32:
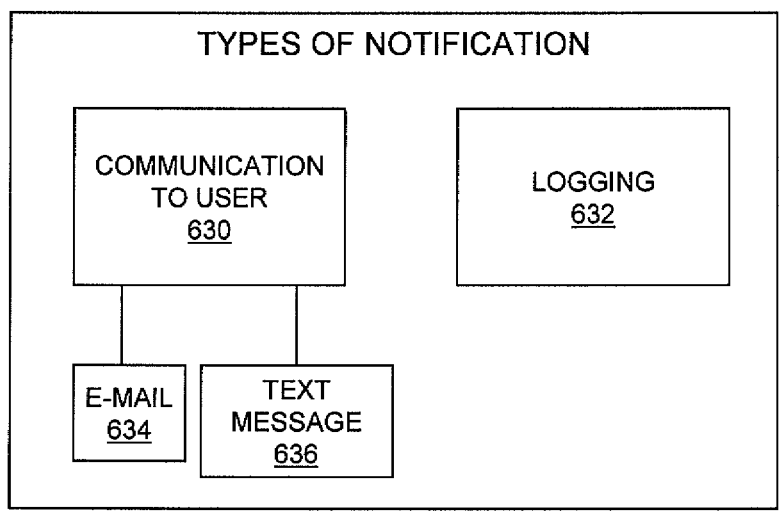
FIG. 32 is a representative view of potential notification methods.

Referring to FIG. 32, exemplary notification methods are shown. A first exemplary notification method is a communication to the user, as represented by block 630. Exemplary communications to the user, include an e-mail message 634 and a text message 636. Additional exemplary types of notification include a voice message, a page, and other suitable methods of communicating the occurrence of the event to the user. A second exemplary notification method is logging, as represented by block 632. Exemplary logging includes a history of the events. In one example, the user may select to have a descriptive textual label saved in a log along with time of occurrence information if a corresponding event occurs. This textual label would be viewable at a later time. This would be useful if a user does not have constant access to a notification device, such as a cell phone, and is only able to periodically check the occurrence of events through user interface 450.

Figure 30:
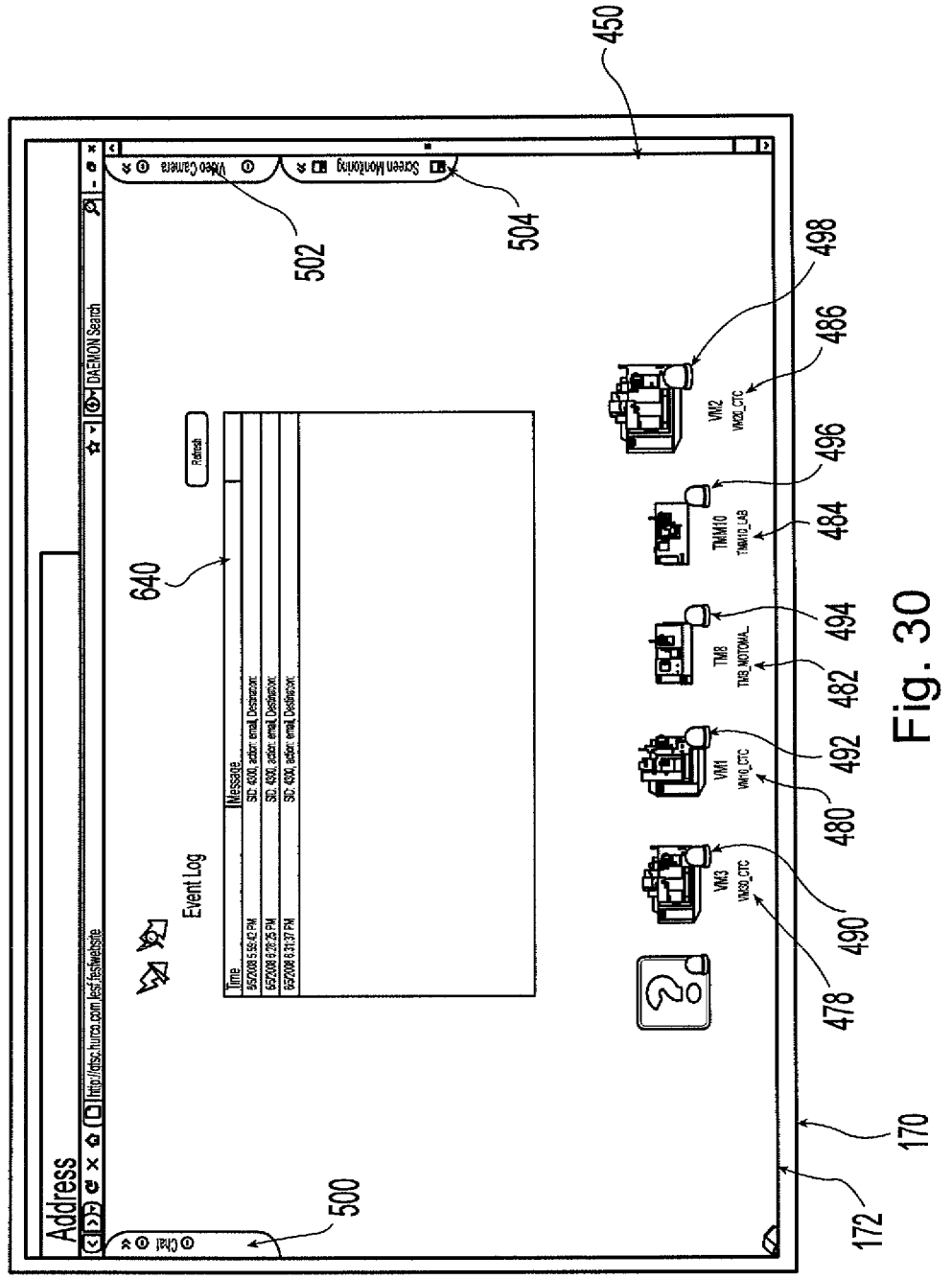
FIG. 30 is a representative view of a screen presented in response to the selection of an event software option of the plurality of selectable options related to a selected machine tool system whereby an event log is displayed.

Referring to FIG. 30, an event log 640 is shown. The event log 640 provides a listing of all events which have been detected in a given time period. As shown in FIG. 30, the event log provides all events which have been detected for the last fourteen days. The log provides the time of each event, the parameter causing the event, the notification action to take in addition to logging, and the destination address to use for the notification action.

Figure 33:
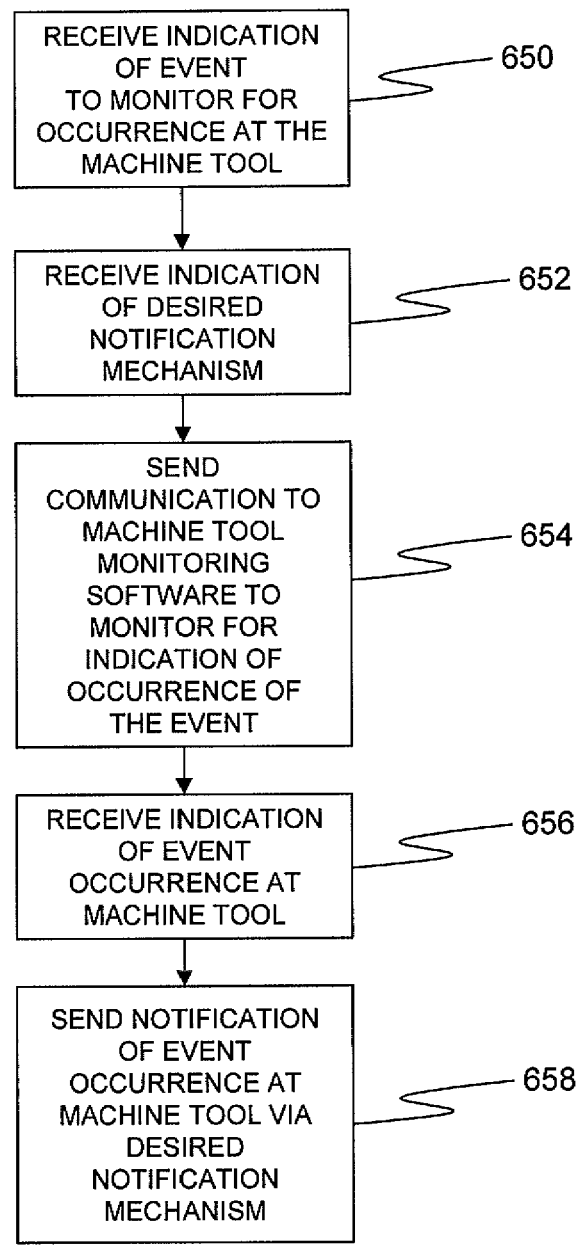
FIG. 33 is a representative view of the process of handling an event for the remote controller of the system of FIG. 1.

The operation of the remote controller 296 in setting events is represented in FIG. 33. Remote controller 296 receives an indication of an event to monitor for the occurrence of at the machine tool system, as represented by block 650. In one embodiment, the indication is received in response to a user selecting input 628. In one embodiment, the indication is received based on the user's occupation. For instance, a service technician will automatically receive all service events. Remote controller 296 further receives an indication of the desired notification mechanism for the event, as represented by block 652. In one embodiment, the indication is received in response to a ser selecting input 628. In one embodiment, the notification mechanism was provided in the user data 420 in collection of information 320 of database 298.

Remote controller 296 sends a communication to monitoring software 291 of the machine tool system to monitor for an indication of the event, as represented by block 654. In one embodiment, the remote controller 296 notifies the monitoring software 291 to monitor a parameter which will be used as the indication of the event. Remote controller 296 upon the occurrence of the event receives the parameter value or other indication, as represented by 656. In one embodiment, wherein the event is based on an M code, the processing of the M code is communicated to remote controller 296. In one embodiment, wherein the event is based on a parameter value, monitoring software 291 sends the value of the parameter at each time interval. Remote controller 296 determines based on the received value whether the corresponding event has occurred or not. In one embodiment, monitoring software 291 determines whether the event has occurred or not. In response to the detection of the event, remote controller 296 sends a notification to the user of the occurrence of the event, as represented by block 658.

In one embodiment, when each machine tool system connects to remote controller 296, the machine tool system provides the current version of each of the components of software 271 to remote controller 296. If remote controller 296 has a newer version of any of the components of software 271, remote controller 296 updates the respective machine tool system. In one embodiment, remote controller 296 downloads the updates to the software and installs the updates with an install shield utility. In one embodiment, remote controller 296 queries the operator of the machine tool system prior to downloading the updates to the software to the machine tool system. In one embodiment, the updates are customer dependent because one customer may have different software options from another customer.

Figure 34:
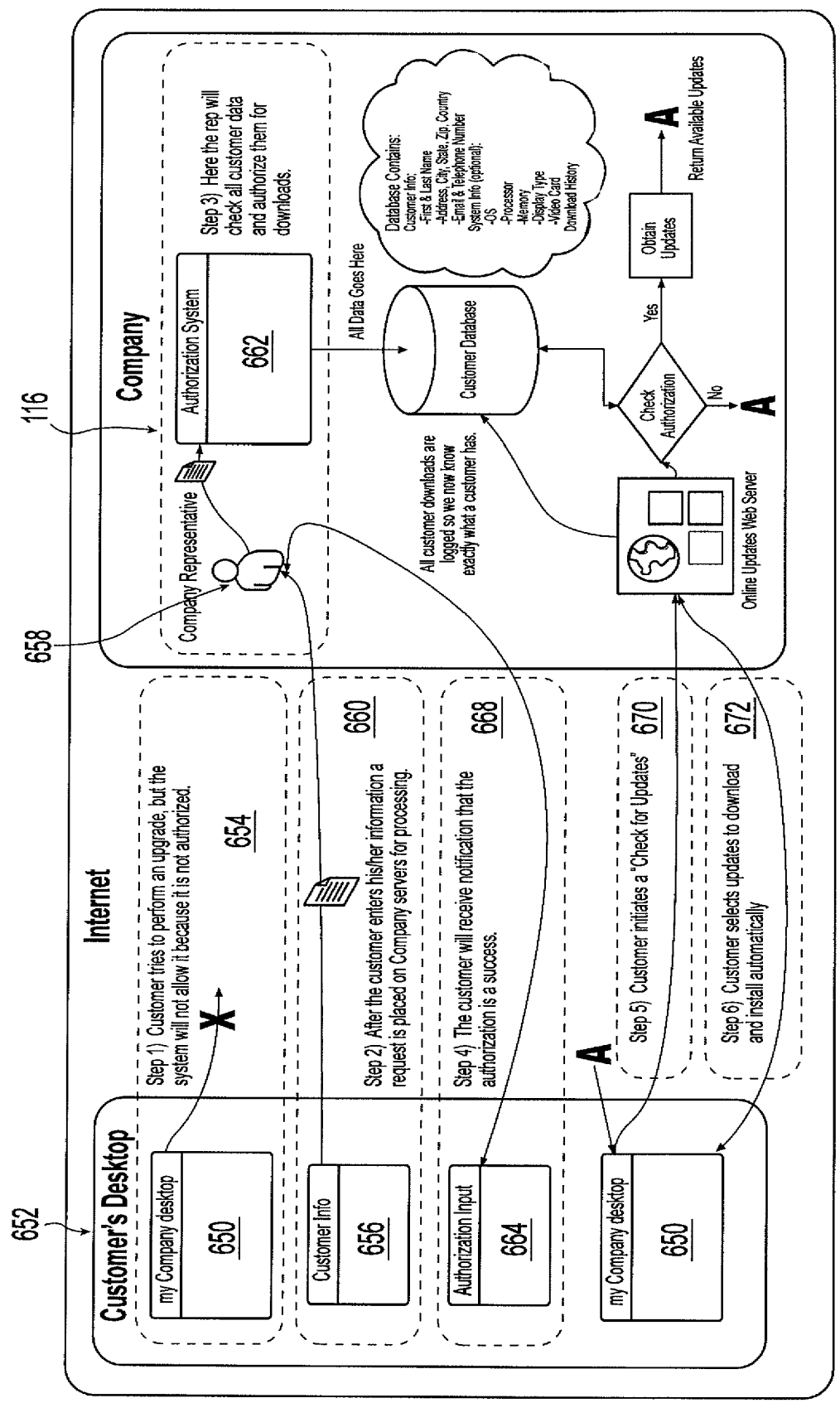
FIG. 34 is a representative view of a software update process.

In one embodiment, machine tool system must register with an authorized representative of the machine tool provider 116 prior to downloading updates to the software 271. Referring to FIG. 34, an exemplary process for updating the software of a machine tool system is shown. An update utility 650 is launched on a desktop 652 of software 271. The machine tool system is connected to machine tool provider 116 through the Internet. The operator of the machine tool system attempts to perform an upgrade with upgrade utility 650 as represented by block 654. The request is denied by the remote controller 296 of the machine tool provider 116 because the machine tool system has not been registered for upgrades.

In response, the operator of the machine tool system provides customer information 656 to an authorized representative 658 of the machine tool provider 116, as represented by block 660. The authorized representative 658 verifies the received customer information with an authorization system 662. In one embodiment, the customer information is a machine tool identification number which is based on the characteristics of the machine tool system as discussed herein.

If the received customer information matches the information available to authorization system 662, the remote controller 296 of machine tool provider 116 provides a notification 664 to the machine tool system that the authorization was successful, as represented by 668. In one embodiment, the notification is a message displayed on desktop 652.

Once authorized for updates, a customer checks for updates, as represented by block 670. This request is received by remote controller 296 and a check is made whether the customer is authorized for updates. If not authorized, a notification is returned to machine tool system that the updates were denied. If authorized, then remote controller 296 sends the updates to software 271 and installs the software automatically, as represented by block 672. In one embodiment, the operator is prompted to determine whether to install updates automatically or to delay the installation. In one embodiment, the operator is prompted with a listing of available updates to which the operator selects one or more update from the listing.

In one embodiment, the updates are pushed down by the machine tool provider instead of initiated by the operator of the machine tool system. in this embodiment, software 271 determines the current version of each of the software modules and sends this information to remote controller 296. Remote controller 296 then pushes down any available updates to the machine tool system.

Figure 35:
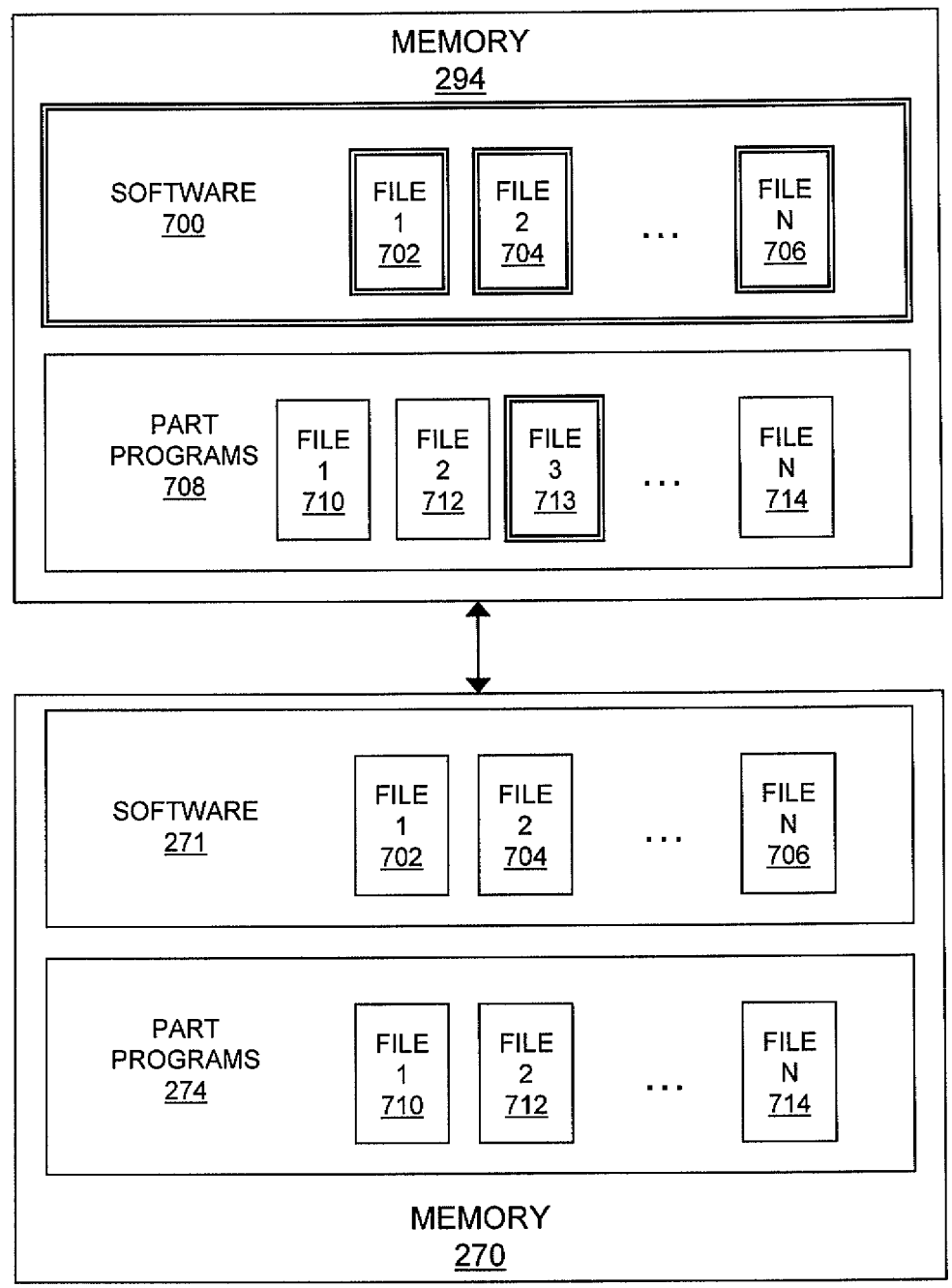
FIG. 35 is a representative view of files stored on the memory associated with the remote controller and the machine tool system.
Figure 36:
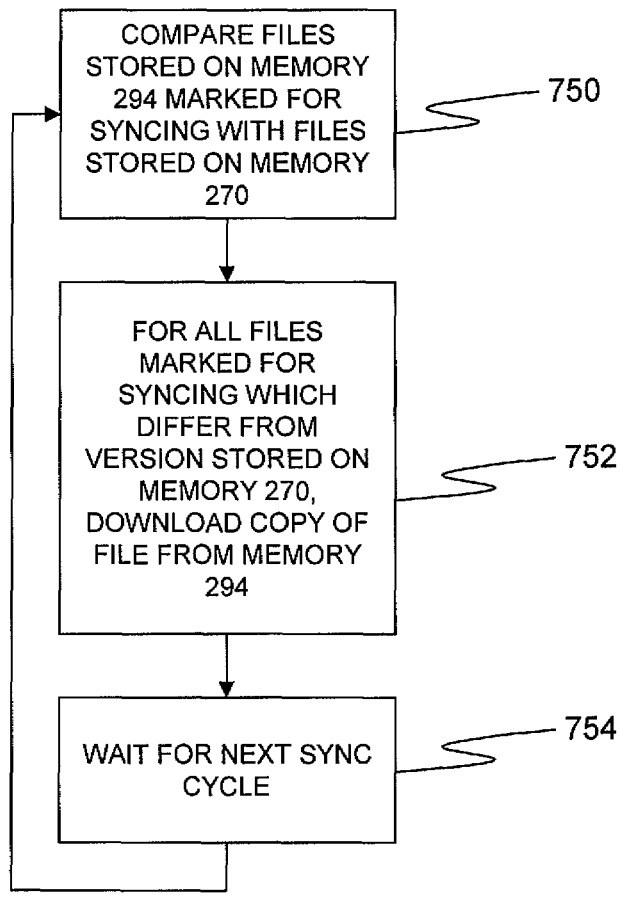
FIG. 36 is a representative view of a software update process.

Referring to FIG. 35 and FIG. 36, another exemplary method of updating software 271 and/or part programs 274 stored on memory 270 is provided. Memory 294 associated with remote controller 296 includes software 700 which corresponds to one or more of the software systems of software 271 of the machine tool system and part programs 708. As shown in FIG. 35, memory 294 includes software 700 having a plurality of files 702-706. Whenever an update is available for software 700, it is installed and stored on memory 294.

Referring to FIG. 36, a comparison is made between files stored on memory 296 marked for syncing and the files stored on memory 270, as represented by block 750. In one embodiment, the comparison is made by remote controller 296. In one embodiment, the comparison is made by the machine tool system.

The files marked for syncing are shown in double outline in FIG. 35. In one embodiment, a file is marked for syncing based on its location in a file structure of memory 294. For instance, memory 294 may include a directory and associated sub-directories which contains all of the files which are to be synced to the machine tool systems.

As shown in FIG. 35, part program files may also be synced to the machine tool systems. In this manner, a customer may download a given part program to all of their machine tool systems. Since customer files are generally specific to a given customer, memory 294 may store the part program files to be synced separately from software 700 and then make a separate check to see if any client specific files (part programs 274) for the respective client need to be synced. In the illustrated example, file 713 is stored on memory 296 and marked for syncing. A prior version of file 713 does not exist on memory 270. That said, copying a new file to memory 270 and replacing an out-of-date file on memory 270 are each types of syncing.

For all files marked for syncing which differ between memory 294 and memory 270, a copy of the file is downloaded to memory 270, as represented by block 752. Relative to software 271 on the machine tool system, this differs from the concept of downloading updates and subsequently installing the updates. By syncing software 271 with software 700, copies of the already installed version of the software are downloaded and ready for execution without the need for a subsequent installation.

In one embodiment, checks are made at spaced apart syncing intervals to see if any files on the machine tool system have an updated copy on memory 294, as represented by block 754.

In one embodiment, a user of a user system or a user of remote controller 296 is able to control the operation of the machine tool system remotely. Exemplary actions include starting a part program.

While this disclosure has been described as having exemplary designs, the present disclosure can be further modified within the spirit and scope of this disclosure. For example, all of the disclosed components of the preferred and alternative embodiments are interchangeable providing disclosure herein of many systems having combinations of all the preferred and alternative embodiment components. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A method of monitoring with a remote controller a first machine tool system and a second machine tool system each of the machine tool systems having a plurality of tools which are used to remove material from a respective blank to form a respective part, the method comprising the steps of:
   receiving a first notification from the first machine tool system that the first machine tool system is active, the first notification being provided through a first data connection to the remote controller, the first data connection being initiated by the first machine tool system;
   receiving a second notification from the second machine tool system that the second machine tool system is active, the second notification being provided through a second data connection to the remote controller, the second data connection being initiated by the second machine tool system;
   receiving periodic updates from the first machine tool system related to a plurality of parameters being monitored by the first machine tool system;
   receiving periodic updates from the second machine tool system related to a plurality of parameters being monitored by the second machine tool system; and
   providing to a remote device a user interface which includes a graphical representation of the first machine tool system and a graphical representation of the second machine tool system.

2. The method of claim 1, further comprising the step of receiving a selection of the first machine tool system through the user interface by a user of the remote device.

3. The method of claim 2, further comprising the step of notifying the first machine tool system that the remote device has selected the first machine tool system.

4. The method of claim 3, wherein the periodic updates from the first machine tool system are at a first time interval and the periodic updates from the second machine tool system are at a second time interval, the first time interval being shorter than the second time interval.

5. The method of claim 1, wherein the periodic updates from the first machine tool system are at a first time interval and the periodic updates from the second machine tool system are at a second time interval, the first time interval being generally equal to the second time interval.

6. The method of claim 1, further comprising the steps of:
   sending a first request to the first machine tool system to provide at least one screen shot of a first display screen of the user interface of the first machine tool; and
   receiving the at least one screen shot of the first display screen of the user interface of the first machine tool.

7. The method of claim 1, further comprising the steps of:
   sending a second request to the first machine tool to provide at least one image taken by a camera directed at the first machine tool; and
   receiving the at least one image taken by the camera directed at the first machine tool.

8. The method of claim 7, wherein the at least one image is a plurality of images taken at spaced apart time intervals of at least one second.

9. The method of claim 1, wherein the first machine tool is at a first facility and the second machine tool is at a second facility spaced apart from the first facility.

* * * * *